United States Patent
Ohkawara

(10) Patent No.: US 6,731,339 B2
(45) Date of Patent: May 4, 2004

(54) LENS CONTROL DEVICE WITH OPERATOR AND SIGNAL CONTROL

(75) Inventor: Hiroto Ohkawara, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/874,053

(22) Filed: Jun. 12, 1997

(65) Prior Publication Data

US 2002/0075395 A1 Jun. 20, 2002

(30) Foreign Application Priority Data

Jun. 19, 1996 (JP) ............................................ 8-158309

(51) Int. Cl.[7] .......................... H04N 5/262; H04N 5/232
(52) U.S. Cl. ..................... 348/347; 348/240.1; 348/354
(58) Field of Search ................. 348/207, 222, 348/234, 239, 240, 272, 273, 280, 282, 345, 347, 349, 351, 353–358, 360, 373, 375; 396/72, 76, 77, 79, 80–82, 85, 87, 89; 359/696, 697, 698; H04N 5/225, 5/262; G03B 13/00

(56) References Cited

U.S. PATENT DOCUMENTS

| 5,155,515 A | * | 10/1992 | Kohmoto | 396/76 |
|---|---|---|---|---|
| 5,204,710 A | * | 4/1993 | Tsukamoto | 348/347 |
| 5,486,860 A | * | 1/1996 | Shiokawa | 348/347 |
| 5,648,836 A | * | 7/1997 | Sato | 396/79 |
| 5,650,819 A | * | 7/1997 | Sato | 348/240 |
| 5,877,811 A | * | 3/1999 | Iijima | 348/375 |
| 5,889,555 A | * | 3/1999 | Kawase | 348/375 |
| 5,956,528 A | * | 9/1999 | Tanaka | 396/81 |
| 6,141,158 A | * | 10/2000 | Kaneda | 359/696 |
| 6,348,948 B1 | * | 2/2002 | Kyuma | 348/360 |

* cited by examiner

*Primary Examiner*—Ngoc-Yen Vu
(74) *Attorney, Agent, or Firm*—Robin, Blecker & Daley

(57) ABSTRACT

An image pickup apparatus has a lens unit detachably mounted on a camera body. A zoom ring is rotatably arranged on the lens unit. A magnification varying action of a zooming lens is controlled by a lens microcomputer according to the rotation of the zoom ring detected by a rotation detecting circuit. The magnification varying action can be controlled also by a camera-body microcomputer according to the operation of a zoom switch disposed on the side of the camera body. The magnification varying action by the zoom ring has priority over the magnification varying action by the zoom switch.

11 Claims, 21 Drawing Sheets

$$a_x = a_k - \frac{(Z_k - Z_x)(a_k - a_{k-1})}{(Z_k - Z_{k-1})}$$

$$b_x = b_k - \frac{(Z_k - Z_x)(b_k - b_{k-1})}{(Z_k - Z_{k-1})}$$

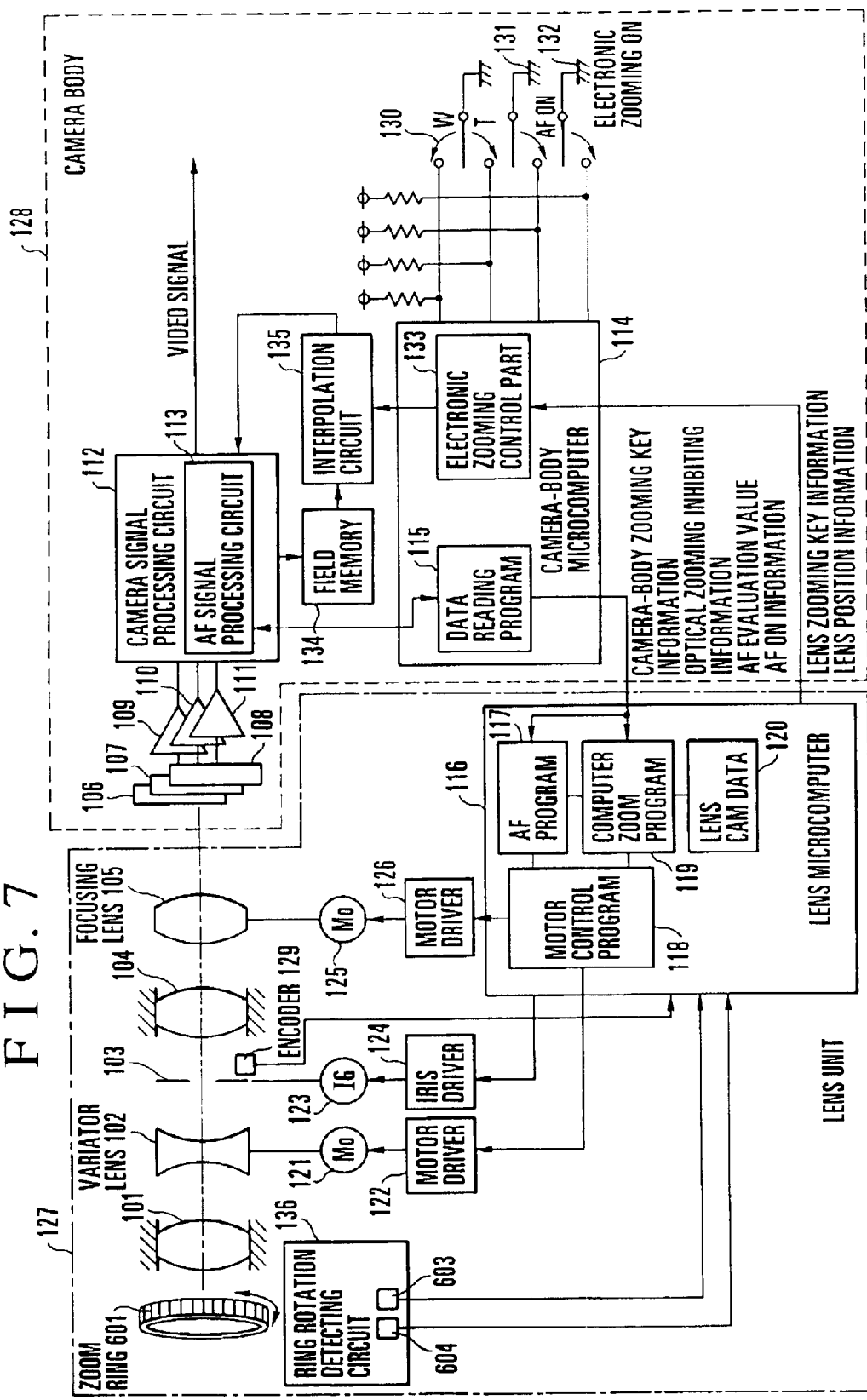

LENS CONTROL DEVICE WITH OPERATOR AND SIGNAL CONTROL

BACKGROUND OF THE INVENTION

1. Field of the Invention

This invention relates to a lens device and an image pickup apparatus adapted for use in lens-interchangeable type video cameras or the like.

2. Description of Related Art

The resent advancement of video apparatuses such as video cameras or the like has been conspicuous. These apparatuses are being arranged to have high performance capabilities and diverse functions. In the case of the video cameras, for example, they have come to be arranged to permit use of interchangeable lenses for the purpose of diversifying their functions and obtaining a higher image quality.

FIG. 1 shows, in a block diagram, the conventional arrangement of a lens-interchangeable type electronic camera adapted for a video camera.

Referring to FIG. 1, a lens unit 816 is arranged to have a variable magnification. A camera body 817 is arranged to permit the lens unit 816 to be mounted thereon. In the lens unit 816, a variator lens 802 and a compensator lens 803 are mechanically connected by a cam. When a magnification varying action is performed either manually or by means of a motor, the variator lens 802 and the compensator lens 803 move together. The variator lens 802 and the compensator lens 803 jointly form a zooming lens. In the lens system of the lens unit 816, a front lens is arranged to be a focusing lens 801. The focus of the lens system is adjusted by moving the focusing lens 801 along the optical axis. Light passing through these lenses is imaged on an image pickup plane of an image sensor 804 which is composed of a CCD or the like and is disposed within the camera body 817. The image thus formed is photo-electrically converted into an electrical signal and is outputted as a video signal. The video signal is supplied to a CDS/AGC (correlated double sampling/automatic gain control) circuit 805 to be sampled and held and amplified to a predetermined level. The amplified video signal is converted into digital video data by an A/D converter 806. The digital video data is supplied to a camera signal processing circuit 819 to be converted into a standard television signal. The digital video signal is supplied also to a band-pass filter (hereinafter referred to as BPF) 807.

At the BPF 807, a high frequency component of the video signal is extracted from the video signal. The output of the BPF 807 is supplied to a gate circuit 808 to extract therefrom only a signal part corresponding to a focus detecting area set within an image plane. The signal extracted is supplied to a peak hold circuit 809 to be peak-held at intervals synchronous with a period which is an integer times as much as the period of a vertical synchronizing signal. An AF (automatic focusing) evaluation value is obtained by this peak holding action. The AF evaluation value is taken in a microcomputer 810 which is disposed within the camera body 817. If the operated state of an AF/MF (automatic focusing/manual focusing) selection switch 823 indicates an AF mode, the camera-body microcomputer 810 decides a focusing speed corresponding to the degree of focusing and a motor driving direction for increasing the AF evaluation value. Information on the driving speed and the driving direction of a focus motor 813 is then sent from the camera-body microcomputer 810 to a microcomputer 811 which is disposed within the lens unit 816. In the event of the MF mode, the camera-body microcomputer 810 sends an instruction to the lens microcomputer 811 to stop the focus motor 813. In accordance with the instruction of the camera-body microcomputer 810, the lens microcomputer 811 makes focus adjustment by causing a motor driver 812 to drive the focus motor 813 in such a way as to move the focusing lens 801 along the optical axis.

Further, according to the operated state of a zoom switch 818, the camera-body microcomputer 810 decides the driving direction and the driving speed of the zooming lens (802 and 803) and sends information on the driving direction and speed to the lens microcomputer 811 to cause the zooming lens (802 and 803) to be driven accordingly by a zoom motor 815 through a zoom motor driver 814 disposed within the lens unit 816. The camera body 817 is arranged to permit the lens unit 816 to be detached therefrom and replaced with another lens unit, so that a photographable range of the video camera can be broadened.

For the purpose of attaining reduction in size and also making it possible to take a shot of an object located immediately in front of the camera, some of lens-integrated cameras designed for general consumers has come to be arranged to store the movement loci of a compensator lens beforehand in a microcomputer as lens cam data, instead of the above-stated arrangement of mechanically interconnecting the compensator lens 803 and the variator lens 802, to drive the compensator lens according to the lens cam data and to adjust focus also by means of the compensator lens. That arrangement is called an inner-focus type lens arrangement and has become popular. The advantages of the inner-focus type lens lie in that it is not expensive and permits system simplification and reduction in size and weight of the lens barrel.

FIG. 2 schematically shows the arrangement of the conventional inner-focus type lens system mentioned above. Referring to FIG. 2, a first lens group 901 is fixed. A second lens group 902 is arranged to be used for varying the magnification of the lens system. Reference numeral 903 denotes an iris. A third lens group 904 is fixed. A fourth lens group 905 is a focusing lens which is arranged to have a focus adjusting function and another function of compensating for a shift of a focal plane caused by a magnification varying action. Reference numeral 906 denotes an image pickup plane. In the lens system illustrated, the focusing lens 905 is arranged, as well known, to perform both the compensating function and the focus adjusting function. Therefore, even when the lens system remains at one and the same focal length, the focusing position of the focusing lens 905 relative to the image pickup plane 906 varies with the object distance, i.e., a distance to a shooting object. When the object distance changes at each focal length, the positions of the focusing lens 905 at which an in-focus state is obtainable on the image pickup plane 906 become as continuously plotted on a graph in FIG. 3. While a magnification varying action is in process, one of the loci of the focusing positions of the focusing lens 905 as shown in FIG. 3 is selected according to the object distance. A zooming action can be accomplished without blurring an image, by moving the focusing lens 905 according to the locus thus selected.

In the case of the front-lens focus type lens system shown in FIG. 1, the compensator lens is arranged independently of the variator lens, and the variator lens and the compensator lens are interconnected by means of a mechanical cam ring. Therefore, with the focal length of the lens system arranged to be manually variable by a manual zooming knob provided on the cam ring, the cam ring can be caused to rotate following the manual zooming knob to let the variator lens and the compensator lens move along the cam groove of the cam ring, at whatever fast speeds the knob may be moved. Therefore, the focal length can be varied as desired without causing any blur as long as the focusing lens of the lens system is in focus.

In controlling the inner-focus type lens system which is arranged as shown in FIG. 2, on the other hand, information on a plurality of lens-position loci which are as shown in FIG. 3 is stored in any suitable form, i.e., in the form of the loci or in the form of functions with the lens positions used as variables. Then, a suitable locus is selected according to the position of the focusing lens and that of the variator lens, and a zooming action is carried out by tracing the selected locus in general.

Further, in reading the position of the focusing lens relative to that of the variator lens for lens control, each lens position must be read out with a certain degree of reading accuracy. Particularly, in a case where the variator lens is moving at a constant or approximately constant speed, the inclination of the locus of the focusing lens is incessantly caused to vary by variations in focal length, as shown in FIG. 3. The varying inclination of the locus indicates that the moving speed and the moving direction of the focusing lens are incessantly varying. In other words, an actuator provided for the focusing lens must be arranged to accurately and speedily respond between 1 Hz and several hundred Hz.

To meet the above-stated requirement, it is a general tendency to employ a stepping motor as an actuator for the focusing lens of an inner-focus lens system. A stepping motor rotates perfectly in synchronism with stepping pulses outputted from a lens controlling microcomputer or the like. Since its stepping angle per pulse is constant, the use of a stepping motor ensures a high speed response, an adequate stopping accuracy and an adequate positional accuracy. Further, the use of a stepping motor permits use of the stepping pulses as an increment type encoder without recourse to any additional position encoder.

In a case where a magnification varying action is desired to be performed while retaining an in-focus state by means of a stepping motor as mentioned above, it is necessary to store beforehand, at a microcomputer or the like, information on the loci of lens positions which are as shown in FIG. 3 either in the form of loci as they are or in some other suitable form such as functions with the lens positions used as variables, to read the information on an applicable locus according to the position or the moving speed of the variator lens, and to cause the focusing lens to be moved according to the information.

FIG. 4 shows by way of example a known method for tracking (tracing) a locus. In FIG. 4, reference symbols Z0, Z1, Z2, - - - and Z6 denote positions of the variator lens. Symbols a0, a1, a2, - - - and a6 and symbols b0, b1, b2, - - - and b6 denote points forming representative loci stored within a microcomputer. Further, symbols p0, p1, p2, - - - and p6 denote points forming a locus computed oh the basis of the above-stated two loci according to the following formula:

$$p(n+1)=|p(n)-a(n)|/|b(n)-a(n)|*|b(n+1)-a(n+1)|+a(n+1) \quad (1)$$

In accordance with the formula (1), in a case where the focusing lens is located at the point p0 as shown in FIG. 4, for example, a ratio in which the point p0 internally divides a line segment b0–a0 is obtained. Then, a point which internally divides a line segment b1–a1 according to the ratio thus obtained is assumed to be the point p1. A moving speed of the focusing lens at which an in-focus state is retainable can be obtained from a positional difference between the points p1 and p0 and a period of time required in moving the variator lens from the position Z0 to the position Z1.

In a case where the stopping positions of the variator lens are not limited to boundaries represented by the data of representative loci stored, the lens position control is performed in the following manner. FIG. 5 is a diagram for explaining a method of making interpolation in the direction of the variator lens position. In this case, a part of FIG. 4 is extracted and the variator lens is considered to be at any arbitrary position. In FIG. 5, the position of the focusing lens is shown on the ordinate axis and that of the variator lens is shown on the abscissa axis. The positions on the representative loci of the focusing lens stored in the lens control microcomputer relative to the variator lens positions are set as follows. The positions of the focusing lens for the variator lens positions $Z_0, Z_1, - - -, Z_{k-1}, Z_k, - - -, Z_n$ are set for different object distances as follows:

$$a_0, a_1, - - -, a_{k-1}, a_k, - - -, a_n,$$

and $$b_0, b_1, - - -, b_{k-1}, b_k, - - -, b_n.$$

In a case where the variator lens position is located at a point $Z_x$ which is not on a zooming boundary and the focusing lens position is at a point $P_x$, focusing lens positions $a_x$ and $b_x$ are obtained respectively in accordance with the following formulas (2) and (3):

$$a_x=a_k-(Z_k-Z_x)*(a_k-a_{k-1})/(Z_k-Z_{k-1}) \quad (2)$$

$$b_x=b_k-(Z_k-Z_x)*(b_k-b_{k-1})/(Z_k-Z_{k-1}) \quad (3)$$

In other words, of the four representative locus data stored, i.e., $a_k, a_{k-1}, b_k$ and $b_{k-1}$ shown in FIG. 5, the data for one and the same object distance are divided internally according to an internal ratio determined by the current variator lens position and two zooming boundary positions (for example, $Z_k$ and $Z_{k-1}$ in FIG. 5) before and after the current variator lens position. The focusing lens positions $a_x$ and $b_x$ can be obtained by carrying out this process. Then, positions $P_k$ and $P_{k-1}$ can be obtained by obtaining an internal ratio from the lens positions $a_x, P_x$ and $b_x$, and by internally dividing data which are included in the four representative data in store ($a_k, a_{k-1}, b_k$ and $b_{k-1}$ in FIG. 5) and are for one and the same focal length in accordance with the internal ratio thus obtained, as explained in the formula (1). Then, in zooming from a wide-angle end position to a telephoto end position, a focusing lens moving speed which is required for retaining an in-focus state can be found from a positional difference between the tracking focusing position $P_k$ and the current focusing position $P_x$ and a period of time required in moving the variator lens from the position $Z_x$ to the position $Z_k$. Further, in zooming from the telephoto end position toward the wide-angle end position, a focusing lens moving speed required for retaining an in-focus state can be found from a positional difference between the tracking focusing position $P_{k-1}$ and the current focusing position $P_x$ and a period of time required in moving the variator lens from the position $Z_x$ to the position $Z_{k-1}$. The known locus tracking (tracing) method is as described above.

While the kinds and arrangement of known zooming actions have been described above, there is another known method for attaining a zooming effect. This method is called "electronic zooming". In the electronic zooming, while the size of an image formed is constant, a range of the image actually outputted to a recording part or to an viewfinder can be gradually changed on an image forming plane. The advancement of various interpolating methods for video signals has come to make the electronic zooming up to two magnifications or thereabout practicable.

The electronic zooming of an interchangeable lens system is described by way of example below with reference again to FIG. 1. The camera signal processing circuit 819 shown in FIG. 1 is arranged to perform white-balance and aperture adjusting processes on a picked-up video image. A video signal processed by the camera signal processing circuit 819 is stored in a field memory 820. An interpolation circuit 821 is arranged to read the image in storage and to output a magnified signal obtained by interpolating the image between scanning lines and between picture elements to vertically and horizontally magnify the image read out. The magnified signal is sent back to the camera signal processing circuit 819 to be converted into the form of a standard TV signal. The standard TV signal thus converted is sent as a video signal to a recording system or a viewfinder system.

The interpolation circuit 821 is controlled by the camera-body microcomputer 810 in accordance with information on a magnifying rate obtained according to the operated state of the zoom switch 818. Assuming that the magnifying rate of the zooming lens is 12 magnifications and that of the electronic zooming is two magnifications, for example, a zooming effect of 24 magnifications can be obtained in all. In this case, when the zoom switch 818 is operated for zooming from the wide-angle end position toward the telephoto end position, a zooming action of connecting the electronic zooming is carried out after the telephoto end position of the optical zooming, as shown in FIGS. 6(a), 6(b) and 6(c). The telephoto end position of the optical zooming is detected by the lens microcomputer 811. The information on the position of the zooming lens is sent from the lens microcomputer 811 to the camera-body microcomputer 810. Then, the camera-body microcomputer 810 decides whether or not the optical zooming is to be shifted to the electronic zooming.

In FIGS. 6(a) to 6(c), the operating time of the zoom switch 818 is shown on the abscissa axis. The ordinate axis shows the total magnifying rate in FIG. 6(a), the magnifying rate of the electronic zooming in FIG. 6(b) and the magnifying rate of the optical zooming in FIG. 6(c). While the electronic zooming is assumed to be arranged to vary the magnifying rate further after arrival of the variator lens at the telephoto end position, the arrangement may be changed to allow the change-over from the optical zooming to the electronic zooming to take place not only at the telephoto end position but also at some other positions in such a way as to have the electronic zooming overlap the optical zooming. Further, while all displacements shown in FIGS. 6(a) to 6(c) are arranged to linearly take place, the system is not limited to that arrangement.

However, in the case of the inner-focus type lens system which is as shown in FIG. 2 and is advantageous in terms of simplification and reduction in cost, size and weight, an attempt to make the lens system of this type into an interchangeable lens unit has encountered the following problem. Unlike the front-lens focus type lens system of FIG. 1, the mechanical arrangement of the lens system of FIG. 2 prevents a direct manual operation on the lens group. Therefore, in varying its magnification, it is possible only to adjust the angle of view by a power zooming action with a motor. This impairs the operability of the video camera. For example, in a case where the lens unit mounted on the camera body is large, a shooting operation is performed with the lens part held by one hand of the operator. Therefore, if no operation mechanism for adjustment of angle of view is provided on the lens part, the operator is compelled to detach his or her eye from a viewfinder to look for a zooming operation switch. In such a case, the video camera cannot be smoothly operated for shooting.

Further, for the interchangeable lens system, no known prior art has made a clear disclosure with respect to a zooming method, particularly a method for interlocking the optical zooming and the electronic zooming, to be applied to a case where an electronic zooming function is arranged on the side of the camera body. The absence of such a method has left the following problem to be solved. The variator lens group in the lens system might move toward the wide-angle end while the electronic zooming function remains in an on-state. Then, while it is possible to take a high quality picture at the same angle of view by combining an electronic magnifying rate with some other optical magnifying rate, the shooting operation might be carried out in a state of having a deteriorated picture quality with the electronic zooming function left in its on-state.

Further, the arrangement of the video camera having an AF/MF selection switch disposed on the side of the camera body has presented another problem that, in cases where shooting must be performed while holding the lens part, the location of the AF/MF selection switch makes the operation not easy. Particularly, where a lens system having manual-zooming and manual-focusing operation systems at the lens part is mounted on the camera body, the locations of the operation members of the lens system must be divided between the lens part and the camera part. As a result, a shooting operation by looking into a viewfinder becomes difficult. In such a case, some wrong switch either might be operated by mistake in search of the AF/MF selection switch or a shooting operation must be suspended in search of the correct switch. Besides, in such a case, adequate shooting might be prevented by shaking of the video camera.

BRIEF SUMMARY OF THE INVENTION

It is an object of this invention to provide a lens control device and an image pickup apparatus which solve the above-stated problems and are arranged, without impairing their operability, to be capable of adequately carrying out a shooting operation with any type of lens unit mounted or at any angle of view.

It is another object of the invention to provide a lens device and an image pickup apparatus having an interchangeable lens system, wherein control over actions to be performed on the side of a camera body can be controlled from on the side of a lens unit.

To attain these objects, a lens control device arranged as a preferred embodiment of the invention comprises variator lens means for performing a magnification varying action, compensator lens means for correcting focus so as to retain an in-focus state during the magnification varying action, operation means operable by a user for causing the magnification varying action to be performed, and control means for controlling the magnification varying action by moving the variator lens means and the compensator lens means along an optical axis according to an operation of the operation means and according to a control signal supplied from an image pickup apparatus body.

An image pickup apparatus arranged as a preferred embodiment of the invention comprises a lens device and an image pickup apparatus body. The lens device comprises variator lens means for performing a magnification varying action, compensator lens means for correcting focus so as to retain an in-focus state during the magnification varying action, first operation means operable by a user for causing the magnification varying action to be performed, and first control means for controlling the magnification varying action by moving the variator lens means and the compensator lens means along an optical axis according to an operation of the first operation means and according to a control signal from the image pickup apparatus body. The image pickup apparatus body comprises image pickup means for obtaining an image signal by picking up an image of an object through the variator lens means and the compensator lens means, second operation means for causing the magnification varying action to be performed, and second control means for sending the control signal to the first control means according to an operation of the second operation means.

A lens device arranged as a preferred embodiment of the invention comprises focusing lens means, operation means operable by a user for permitting or inhibiting a focusing action, and control means for performing control to move the focusing lens means to an in-focus point according to an operation of the operation means and according to a control signal supplied from an image pickup apparatus body for permitting or inhibiting the focusing action.

An image pickup apparatus arranged as a preferred embodiment of the invention comprises a lens device and an image pickup apparatus body. The lens device comprises focusing lens means, first operation means operable by a user for permitting or inhibiting a focusing action, first control means for performing control to move the focusing lens means to an in-focus point according to an operation of the first operation means and according to a control signal supplied from the image pickup apparatus body for permitting or inhibiting the focusing action. The image pickup apparatus body comprises image pickup means for obtaining an image signal by picking up an image of an object through the focusing lens means, second operation means operable by the user for permitting or inhibiting the focusing action, and second control means for sending the control signal to the first control means according to an operation of the second operation means.

It is a further object of the invention to provide a lens control device and an image pickup apparatus which are arranged such that, with a lens device mounted on an image pickup apparatus body, a magnification varying action can be performed separately from operation control performed on the side of the image pickup apparatus body, by operating operation means provided on the side of the lens device.

It is a still further object of the invention to provide a lens control device and an image pickup apparatus which are arranged such that, with a lens device mounted on an image pickup apparatus body, starting and stopping of a focusing action can be controlled separately from operation control performed on the side of the image pickup apparatus body, by operating operation means provided on the side of the lens device.

These and other objects and features of the invention will become apparent from the following detailed description of embodiments thereof taken in conjunction with the accompanying drawings.

BRIEF DESCRIPTION OF THE SEVERAL VIEWS OF THE DRAWING

FIG. 7 is a block diagram showing the arrangement of a first embodiment of the invention.

DETAILED DESCRIPTION OF THE INVENTION

Figure 1:
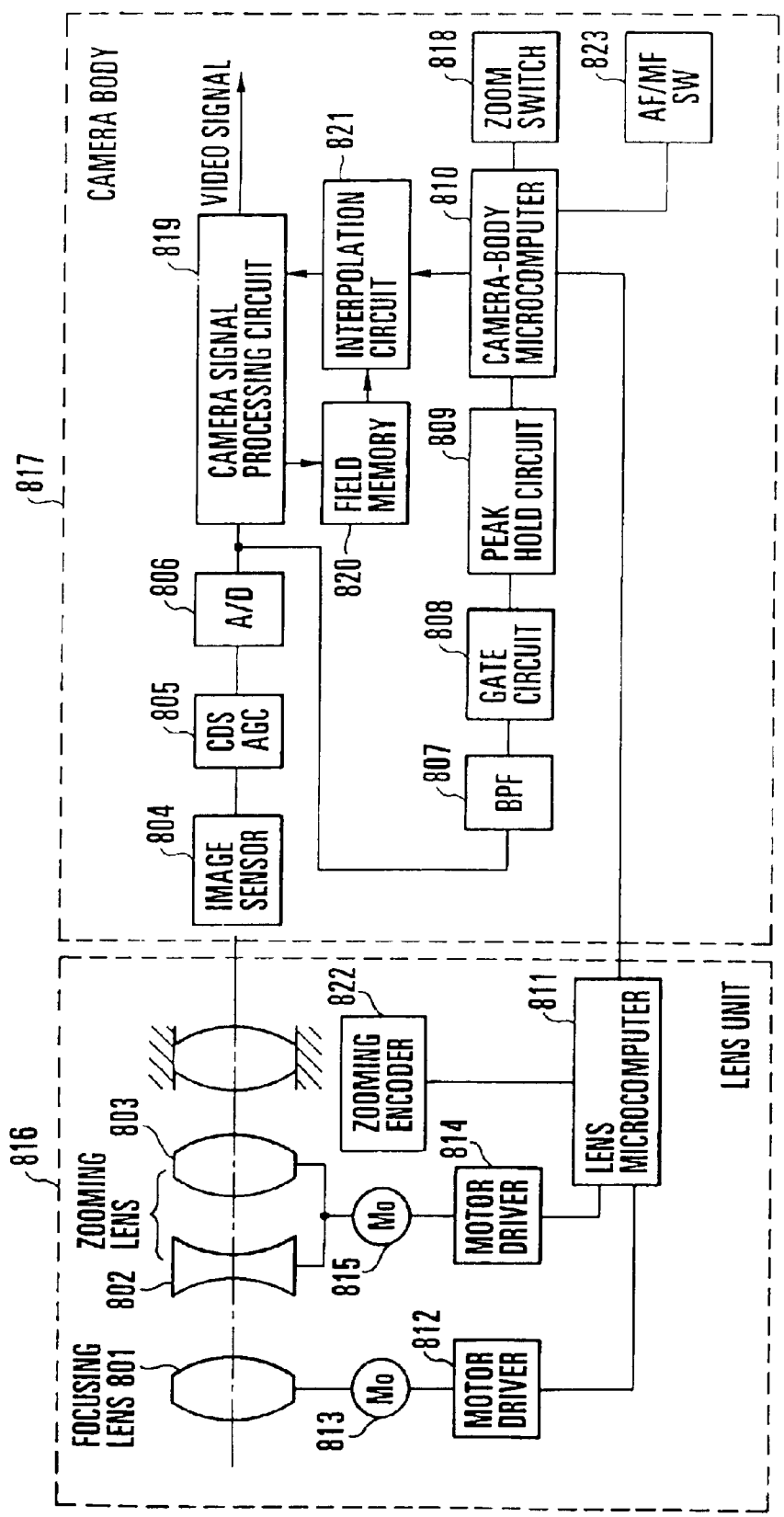
FIG. 1 shows in a block diagram the arrangement of a lens interchangeable type electronic camera.

Hereinafter, preferred embodiments of this invention will be described in detail with reference to the drawings.
First Embodiment Referring to FIG. 7, reference numeral 127 denotes a lens unit, and reference numeral 128 denotes a camera body. Light from an object of shooting passes through a first lens group 101 which is fixed, a second lens group 102 arranged to perform a magnification varying action (hereinafter referred to as a variator lens), an iris 103, a third lens group 104 which is fixed, and a fourth lens group 105 arranged to perform a focus adjusting function and also a compensating function to correct a focal plane shifted by the magnification varying action (hereinafter referred to as a focusing lens). Of the three primary colors of the incident light, a red color component is imaged on an image sensor 106 which is a CCD or the like. A green color component is imaged on another image sensor 107 which is a CCD or the like. A blue color component is imaged on a further image sensor 108 which is also a CCD or the like.

Figure 2:
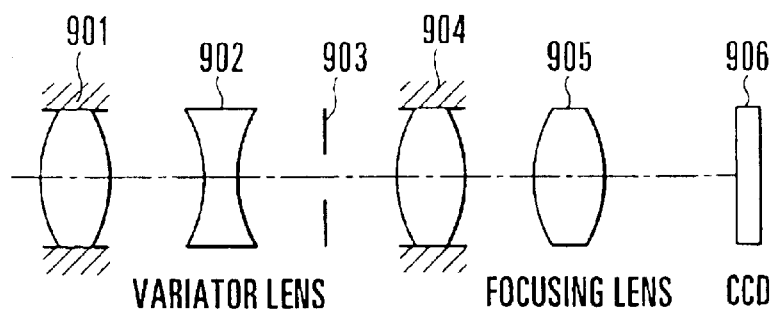
FIG. 2 shows the arrangement of an inner-focus type lens system.
Figure 3:
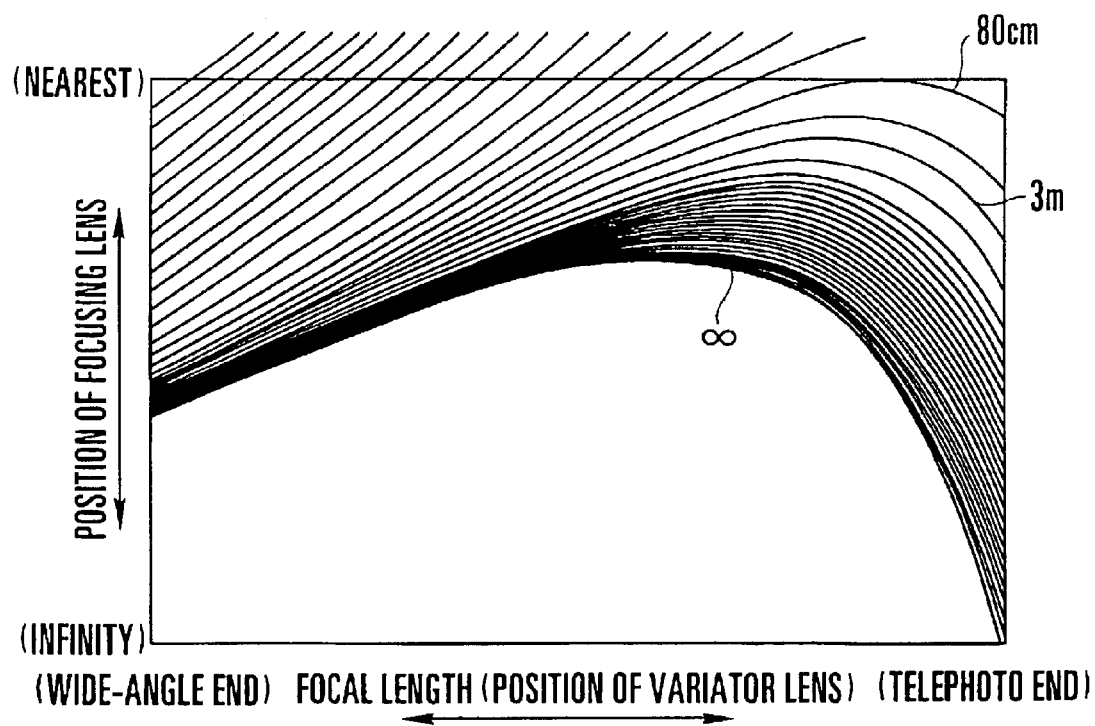
FIG. 3 shows the characteristics of the inner-focus type lens system.
Figure 4:
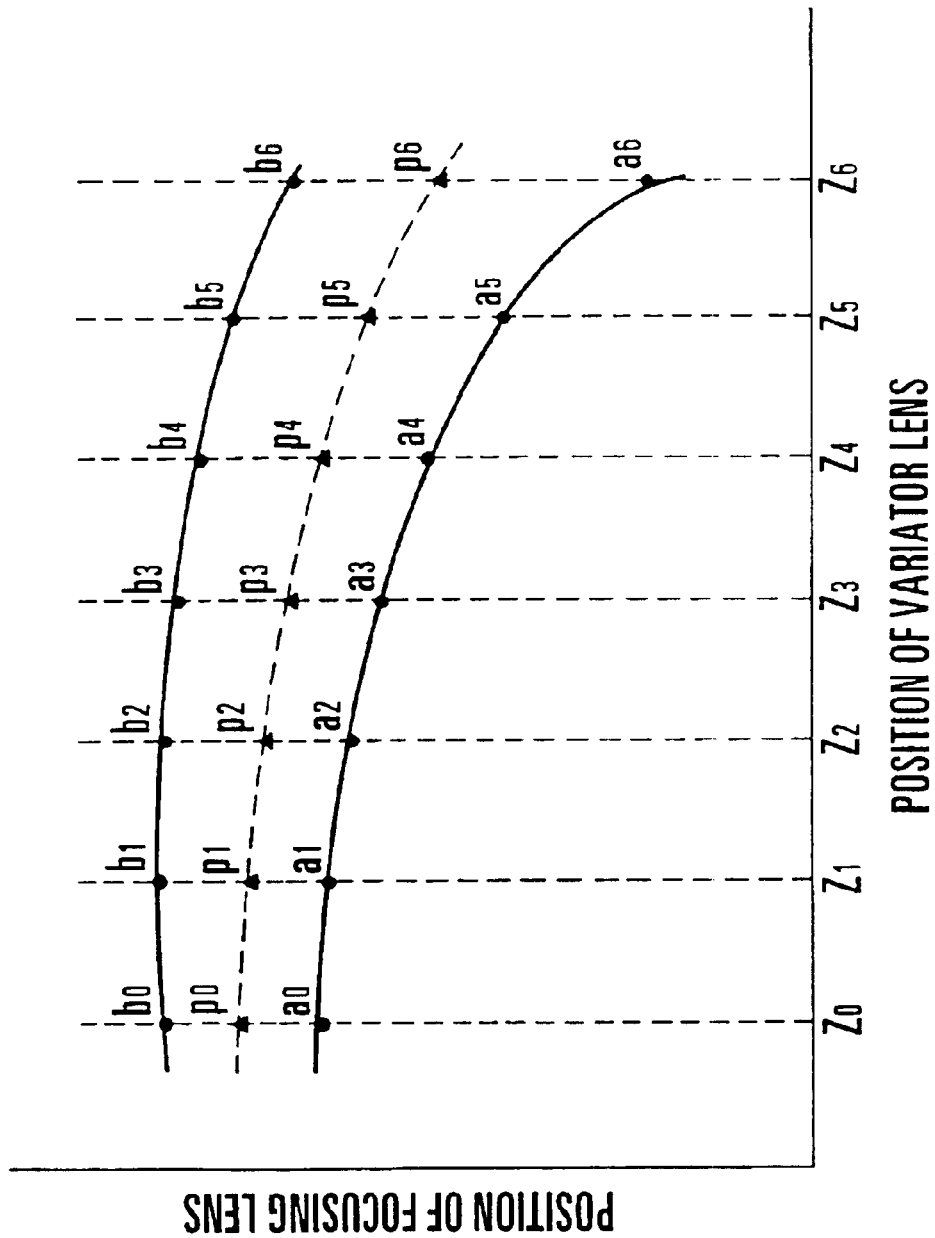
FIG. 4 is a graph showing by way of example a locus tracking method.
Figure 5:
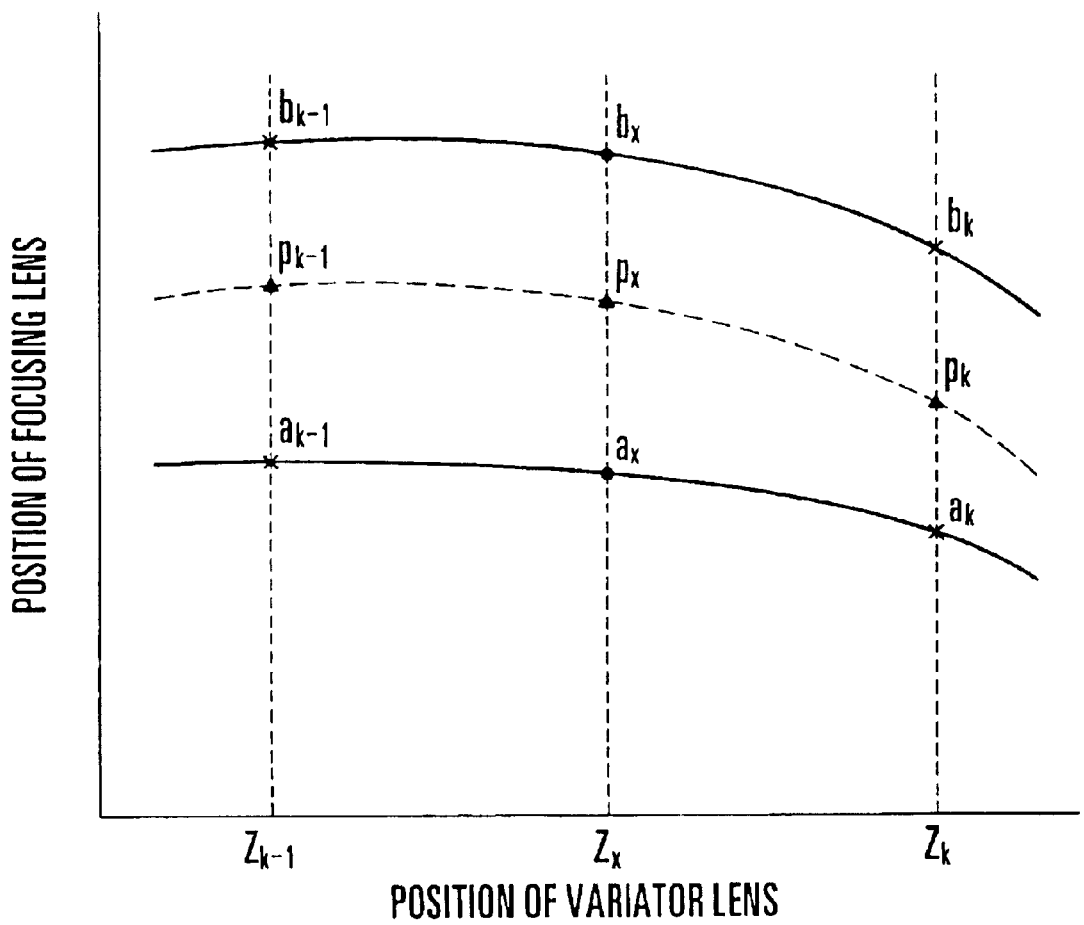
FIG. 5 is a graph showing how interpolation is made in the direction of variator lens positions.
Figure 6A:
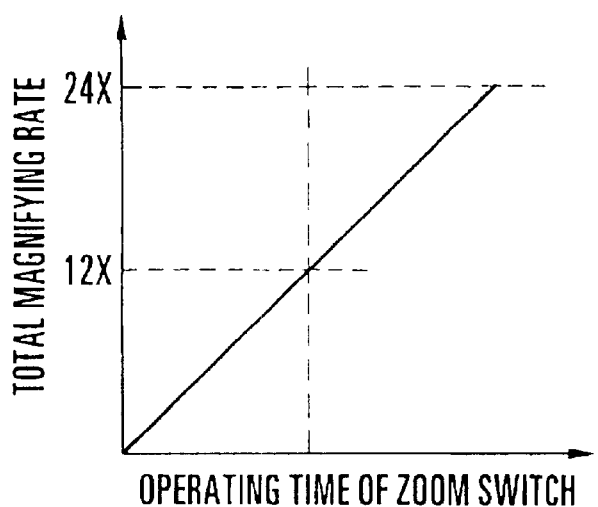
FIGS. 6(a) to 6(c) show a relation between electronic zooming and optical zooming.
Figure 6B:
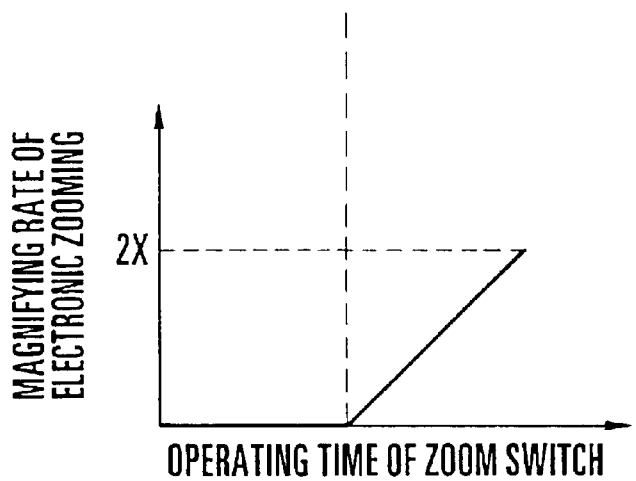
Figure 6C:
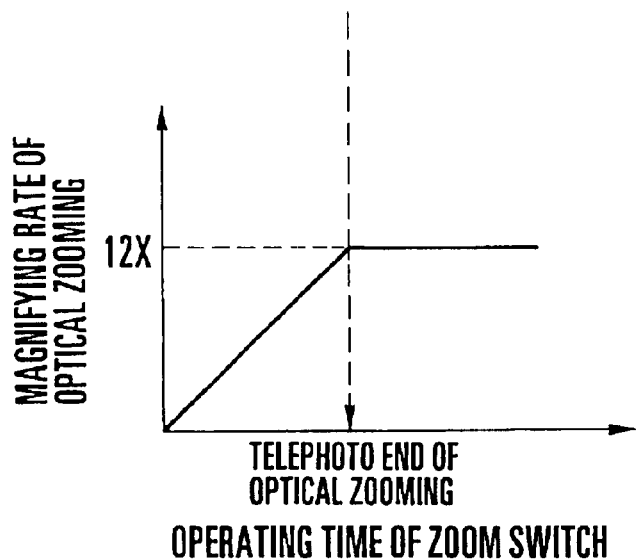

The lens groups 101 to 105 are arranged in the same manner as the inner-focus type lens system which is shown in FIG. 2 and described in the foregoing. The lens system is arranged in combination with stepping motors for reduction in size and simplification of driving force transmission systems. Stepping pulses to be supplied to each stepping motor can be easily generated within a lens microcomputer 116 which is arranged to control the lens unit. Therefore, by counting the number of the stepping pulses outputted from the lens microcomputer 116, lens positions can be accurately found without arranging any additional encoder for detection of lens positions.

The conventional front-lens focus type lens system is generally provided with a zooming mechanism which is arranged to move a zooming lens by rotating a zoom ring which is fitted on a lens barrel and is mechanically connected to the zooming lens. The zooming mechanism is advantageous in the following points: (i) the lens can be moved in proportion to the amount of its rotation, and (ii), therefore, zooming can be smoothly performed from coarse adjustment to fine adjustment.

In the case of the conventional inner-focus type lens system, on the other hand, it is difficult to mechanically connect the zoom ring to the lens and to move the lens by an external force, because: (i) all the movable lenses are disposed within the lens barrel, (ii) if the lens is directly rotated with a mechanically connected cam ring or the like without recourse to a control circuit, some error arises between the count value of the stepping motor driving pulses and the actual lens position, and (iii) a driving force transmission system which is simply arranged is not suited for a mechanical manual operation.

Figure 8:
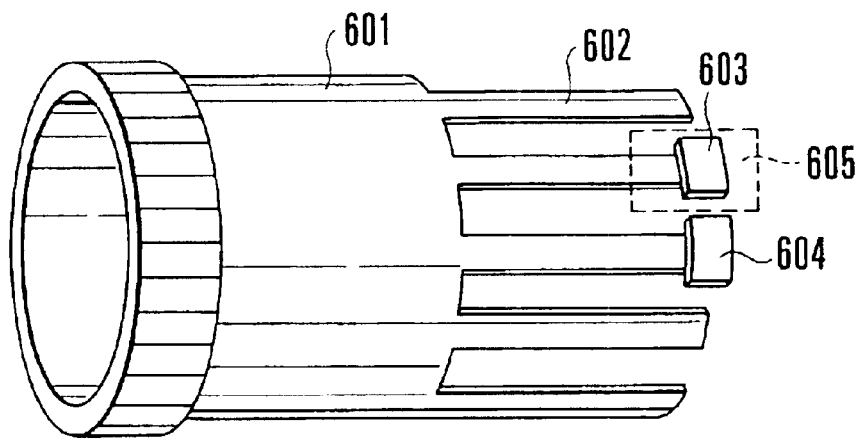
FIG. 8 is a perspective view of a zoom ring.

A first feature of the first embodiment of the invention lies in that, even an inner-focus type lens can be arranged in accordance with the invention to have an adequate manual zooming operability in the same manner as a front-lens focus type lens. For this purpose, in the case of the first embodiment, a zoom ring 601 which is a zooming operation member arranged as shown in FIG. 8 is fitted on a lens barrel, and the movement of the variator lens 102 can be controlled by electrically detecting the direction and speed of the rotation of the zoom ring 601.

Figure 9:
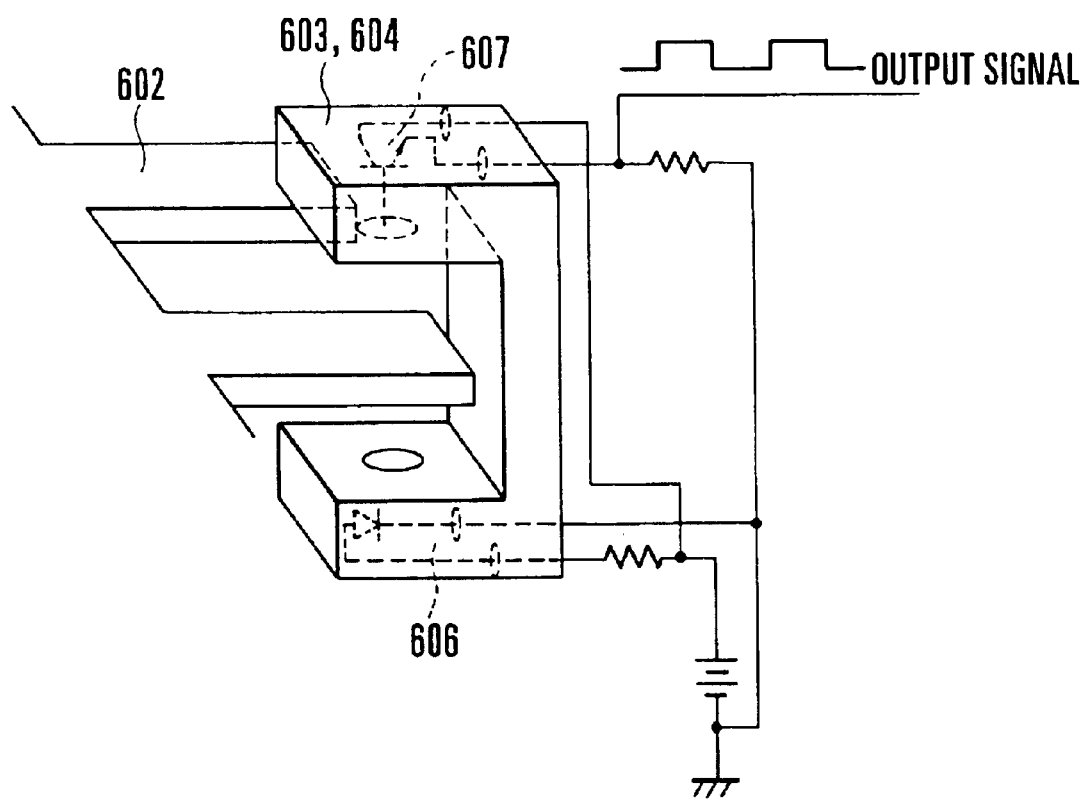
FIG. 9 shows in detail a rotation detecting part of the zoom ring.

The arrangement and the operation of the zoom ring 601 are described in detail as follows. Referring to FIG. 8, the zoom ring 601 which is of a rotating type is arranged to be fitted on a lens barrel. An encoder part 602 is arranged in a comb-like shape consisting of parts reflecting light and parts transmitting light. Each of light projecting-and-receiving parts 603 and 604 consists of a light projecting part 606 and a light receiving part 607 as shown in FIG. 9 and is arranged to have the state of its output signal obtained with a reflection light of the encoder part 602 received vary from a state obtained with the reflection light not received. FIG. 9 shows in an enlarged state a part 605 of FIG. 8 encompassed with a broken line.

Figure 10:
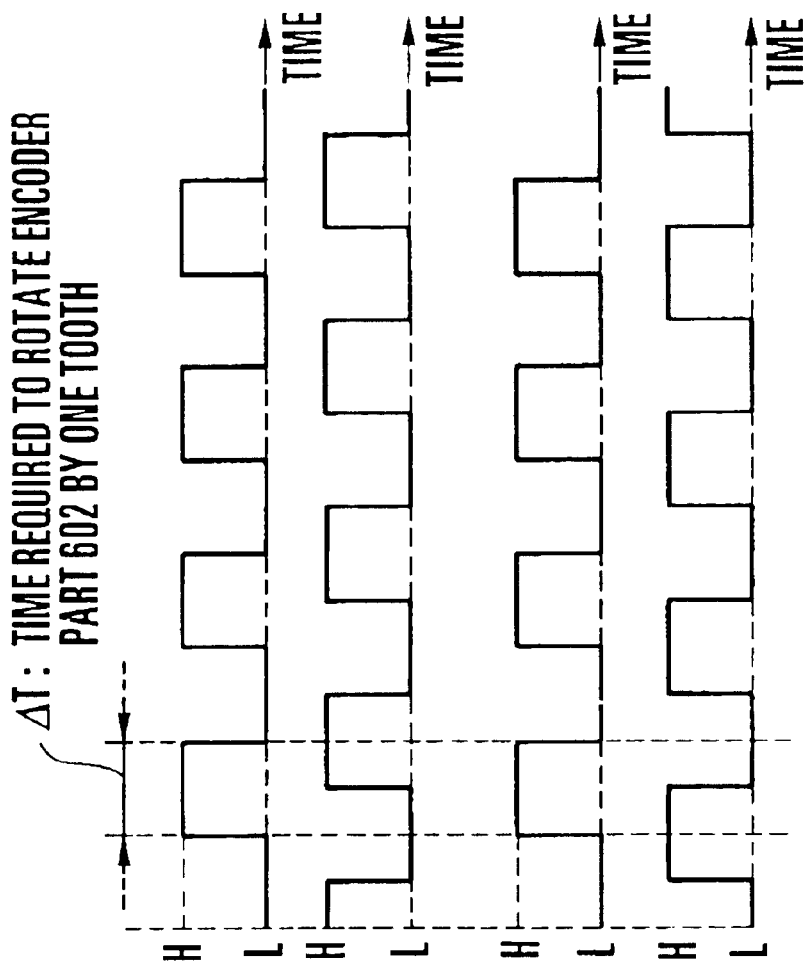
FIGS. 10(a) and 10(b) show in a timing chart the operation of the rotation detecting part.

FIGS. 10(*a*) and 10(*b*) show in a timing chart how the rotation of the zoom ring 601 is detected. When the zoom ring 601 is rotated, the output signals of the light projecting-and-receiving parts 603 and 604 vary as shown in FIGS. 10(*a*) and 10(*b*). The positions of the light projecting-and-receiving parts 603 and 604 are arranged to be in such a relation to each other that the phases of the two output signals from them are deviating by a suitable amount. The rotation speed of the zoom ring 601 is detected by the period of changes taking place in the output signals. The rotating direction of the zoom ring 601 is detected by a phasic relation between the two output signals. Assuming that FIG. 10(*a*) shows the waveforms of the output signals obtained when the zoom ring 601 is rotated in the normal direction, the waveforms shown in FIG. 10(*b*) are obtained when the zoom ring 601 is rotated in the reverse direction. The direction and the speed at which the variator lens 102 is to be driven are decided with the output signals of the light projecting-and-receiving parts 603 and 604 taken in the lens microcomputer 116.

The provision of the zoom ring 601 which is arranged in the above-stated manner enables the inner-focus type lens system to permit a zooming action with the same operation feeling as the feeling obtainable by the front-lens focus type lens system. The method for performing a zooming action by means of the zoom ring 601 will be described in detail later herein.

Again referring to FIG. 7, the lens unit 127 includes a ring rotation detecting circuit 136 in which the encoder part 602 and the light projecting-and-receiving parts 603 and 604 are arranged for the zoom ring 601 in the above-stated manner. With the images of the color components of light coming through the lens system formed respectively on the image sensors 106, 107 and 108, these images are photo-electrically converted into electrical signals and amplified up to optimum levels respectively by amplifiers 109, 110 and 111. The signals amplified are supplied to a camera signal processing circuit 112 to be converted into a standard television signal. At the same time, the signals amplified are supplied also to an AF signal processing circuit 113 to obtain an AF evaluation value. The AF evaluation value formed at the AF signal processing circuit 113 is read out according to a data reading program 115 arranged in a camera-body microcomputer 114. The AF evaluation value read out is transferred to the lens microcomputer 116.

Further, the camera-body microcomputer 114 also reads the states of a zoom switch 130 and an AF switch 131 and sends information on these states to the lens microcomputer 116. At the lens microcomputer 116, if the information from the camera-body microcomputer 114 indicates that the AF switch 131 is in an off-state while the zoom ring 601 is in process of rotation or that the zoom switch 130 is in a state of being pushed, a computer zoom program 119 is used to send a signal to a zoom motor driver 122 on the basis of lens cam data 120 which is in storage within the lens microcomputer 116 in such a way as to drive the variator lens 102 via a zoom motor 121 either toward a telephoto end position or toward a wide-angle end position either according to the rotating direction of the zoom ring 601 or according to the direction in which the zoom switch 130 is being pushed. As a result, the variator lens 102 is moved by the zoom motor 121 accordingly. At the same time, a signal is sent to a focus motor driver 126 to cause the focusing lens 105 to be moved by a focus motor 125, so that a magnification varying action is performed.

It is necessary to retain an in-focus state when the zoom ring 601 is rotating or the zoom switch 130 is being pushed while the AF switch 131 is in an on-state. In that case, therefore, the computer program 119 causes a magnification varying action to be performed making reference not only to the lens cam data 120 stored within the lens microcomputer 116 but also to an AF evaluation value signal sent from the camera-body microcomputer 114, so that the magnification varying action can be carried on in such a way as to have the lens in positions where the maximum value of the AF evaluation value can be retained.

Further, in a case where the zoom switch 130 is being pushed while the zoom ring 601 is rotating, priority is given to the zoom ring 601, so that the same operability as the front-lens focus type lens system can be attained. When the zoom ring 601 is not rotating or when the zoom switch 130 is not pushed while the AF switch 131 is in its on-state, an automatic focusing (AF) action is performed. For the automatic focusing action, an AF program 117 sends a signal to the focus motor driver 126 for causing the focusing lens 105 to be moved by the focus motor 125 in such a way as to cause the value of the AF evaluation value signal sent from the camera-body microcomputer 114 to become a maximum AF evaluation value.

A second feature of the first embodiment of the invention lies in that an electronic zooming action can be smoothly carried out also by operating the zoom ring 601 which is disposed as a zooming operation member on the side of the lens unit 127. It is necessary, for this purpose, to exchange information of varied kinds between the lens unit 127 and the camera body 128. The camera body 128 is provided with an electronic zooming function for obtaining an electronic zooming effect through an image processing action. The video signal processed by the camera signal processing circuit 112 is stored in the field memory 134. For the electronic zooming, the interpolation circuit 135 makes interpolation between scanning lines and between picture elements while reading out from the field memory 134 the stored video signal to obtain a magnified signal which are vertically and horizontally magnified. The magnified signal obtained is sent from the interpolation circuit 135 back to the camera signal processing circuit 112 to be converted into the form of a standard TV signal through various processes such as a color processing action. The magnified signal thus processed is sent out as a video signal to a recording system or a viewfinder system.

The interpolation circuit 135 is under the control of an electronic zoom control part 133 which is disposed within the camera-body microcomputer 114. The electronic zoom control part 133 controls the magnifying rate of the electronic zooming by sending information on a magnifying rate to the interpolation circuit 135 according to information on the operating state of the zoom switch 130, information on the position of the variator lens 102 sent from the lens microcomputer 116, and information on the operating state of the zoom ring 601. Further, to prevent the optical zooming to be made toward the wide-angle end by the operation of the zoom ring 601 or the zoom switch 130 to allow shooting in a state of having a deteriorated image quality after magnifying images by the electronic zooming, while high quality image shooting is possible by a combination of optical and electronic magnifying rates, any lens moving action by the optical zooming is arranged to be inhibitable from on the side of the camera-body 128.

While the details of the electronic zooming will be described later herein, the AF signal processing circuit 113 is next described with reference to FIG. 11.

Figure 11:
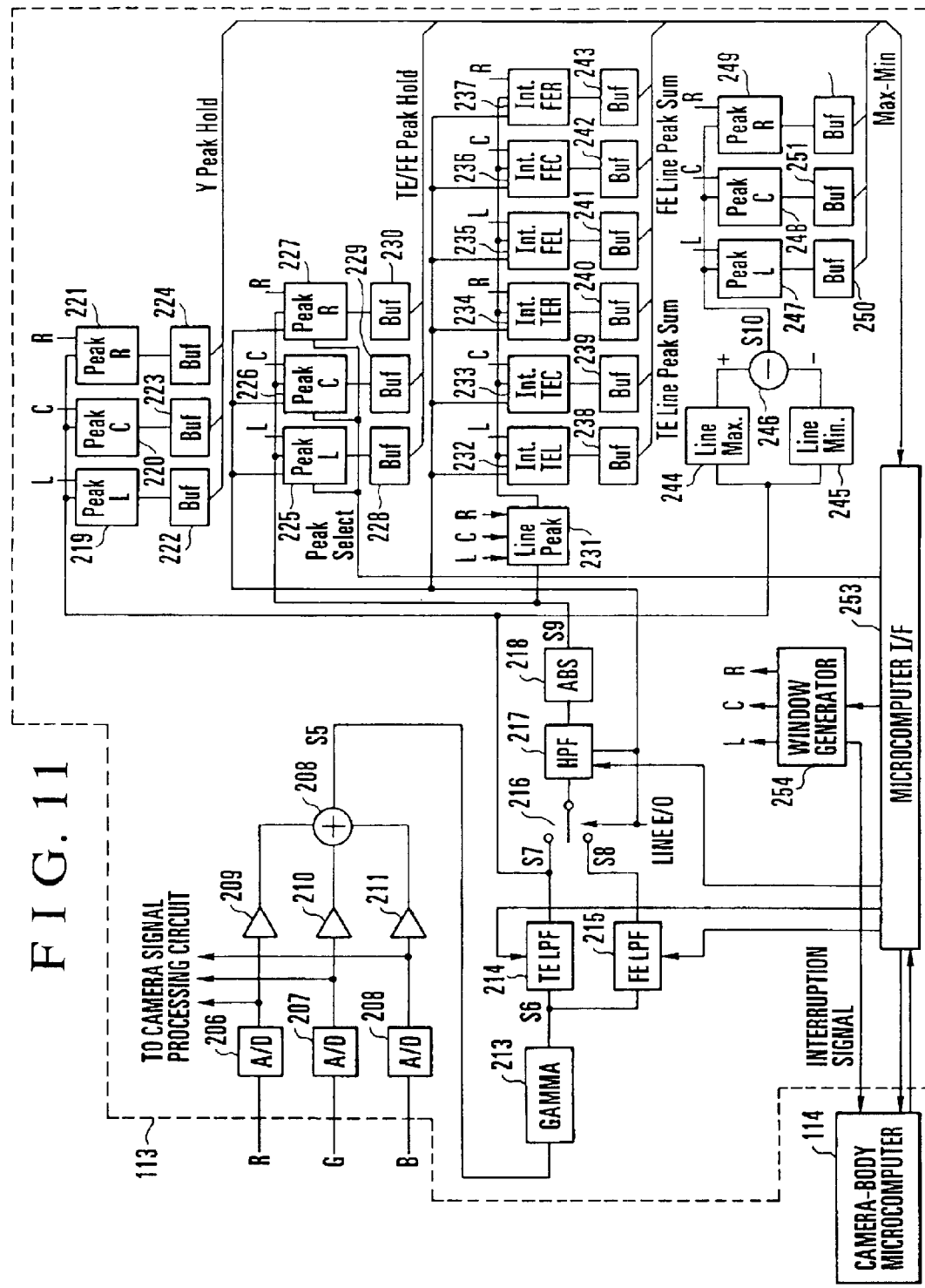
FIG. 11 shows in a block diagram the details of an AF signal processing circuit.

The color components R (red), G (green) and B (blue) of a picked up image which are amplified up to the optimum levels respectively by the amplifiers 109, 110 and 111 shown in FIG. 7 are respectively converted into digital signals by A/D converters 206, 207 and 208 shown in FIG. 11. These digital signals are sent to the camera signal processing circuit 112 and, at the same time, also to amplifiers 209, 210 and 211 to be amplified to an optimum state. The amplified digital signals are added together by an adder 208 to obtain a luminance signal S5 to be used for automatic focus adjustment. The signal S5 is supplied to a gamma circuit 213 to be subjected to a gamma conversion process which is carried out according to a predetermined gamma curve. As a result, a signal S6 is obtained by emphasizing a low luminance component and suppressing a high luminance component of the signal S5. The gamma-converted signal S6 is supplied to a TE-LPF 21 which is a low-pass filter of a high cutoff frequency and to a FE-LPF 215 which is a low-pass filter of a low cutoff frequency. At these low-pass filters, the low frequency components are extracted according to their filter characteristics determined by the camera-body microcomputer 114 through a microcomputer interface (I/F) 253. As a result, the TE-LPF 214 outputs a signal S7 and the FE-LPF 215 outputs a signal S8.

The signals S7 and S8 are selected by a switch 216 according to a line E/O signal which is for making a discrimination between an even-number horizontal line and an odd-number horizontal line. After the switch 216, the signals S7 and S8 are inputted to a high-pass filter (HPF) 217. More specifically, on the even-number line, the signal S7 is supplied to the HPF 217. On the odd-number line, the signal S8 is supplied to the HPF 217. The HPF 217 extracts only a high frequency component according to odd-number/even-number filter characteristics determined by the camera-body microcomputer 114 through the microcomputer interface 253. The output of the HPF 217 is supplied to an absolute value circuit 218 to be converted into an absolute value to obtain a positive signal S9. The signal S9 is supplied to peak hold circuits 225, 226 and 227 and a line peak hold circuit 231.

Figure 12:
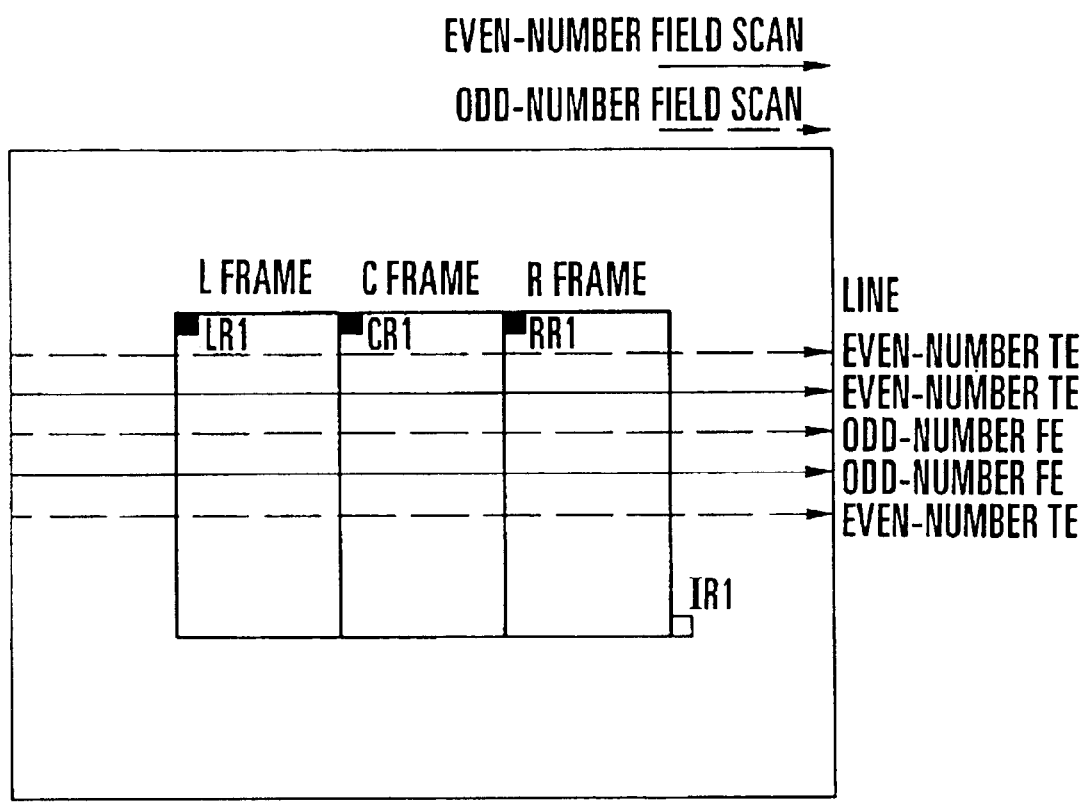
FIG. 12 shows how the AF signal processing circuit operates.

A window generator circuit 254 is arranged to generate an L frame signal, a C frame signal and an R frame signal as focus adjusting gate signals in positions within an image plane as shown in FIG. 12. FIG. 12 shows the operation timing obtained within the AF signal processing circuit 113. In FIG. 12, an outside frame represents an effective video image plane of the outputs of the image sensors 106, 107 and 108. Three divided frames located inside of the image plane are focus adjusting gate frames including an L frame which is located on the left side, a C frame which is located in the center, and an R frame which is located on the right side of the image plane. The L, C and R frames are formed respectively by the L frame signal, the C frame signal and the R frame signal which are outputted from the window generator circuit 254.

Reset signals LR1, CR1 and RR1 are formed by outputting reset signals at the start positions of these frames. Integrating circuits, peak hold circuits, etc., which will be described later are reset by these reset signals LR1, CR1 and RR1. Upon completion of these frames, a data transfer signal IR1 is formed for transferring each integral value and each peak hold value respectively to applicable buffers. In FIG. 12, scanning of an even-number field is indicated by a full line. Scanning of an odd-number field is indicated by a broken line. For both the even-number and odd-number fields, the output of the TE-LPF 214 is selected for even-number lines while the output of the FE-LPF 215 is selected for odd-number lines.

Referring again to FIG. 11, the L frame signal outputted from the window generator circuit 254 and the line E/O signal for a discrimination between even-number-th and odd-number-th horizontal lines are inputted to the peak hold circuit 225. The peak hold circuit 225 is initialized at each part of the reset signal LR1 which is located at an upper left leading part of the focus adjusting L frame as shown in FIG.

12. Then, within each frame, the signal S9 of either an even-number line or an odd-number line which is designated by the camera-body microcomputer 114 through the microcomputer interface 253 is peak-held. The peak-held value thus obtained within the frame is caused by the data transfer signal IR1 to be transferred to a buffer 228 to form a TE/FE peak evaluation value.

The C frame signal from the window generator circuit 254 and the line E/O signal are likewise inputted to the peak hold circuit 226 to initialize the peak hold circuit 226 at the reset signal CR1 located at an upper left leading part of the focus adjusting C frame as shown in FIG. 12. Then, the signal S9 of either an even-number line or an odd-number line within each frame, designated by the camera-body microcomputer 114 through the microcomputer interface 253, is peak-held. The peak-held value thus obtained within the frame is caused by the data transfer signal IR1 to be transferred to a buffer 229 to form a TE/FE peak evaluation value. Further, to the peak hold circuit 227 are inputted the R frame signal of the window generator circuit 254 and the line E/O signal to likewise initialize the peak hold circuit 227 at the reset signal RR1 located at an upper left leading part of the focus adjusting R frame as shown in FIG. 12. Then, the signal S9 of either an even-number line or an odd-number line within the frame, designated by the camera-body microcomputer 114 through the microcomputer interface 253, is peak-held and is then caused by the data transfer signal IR1 to be transferred to a buffer 230 to form a TE/FE peak evaluation value.

To the line peak hold circuit 231 are supplied the signal S9 and the L, C and R frame signals outputted from the window generator circuit 254. The line peak hold circuit 231 is thus initialized at a start point in the horizontal direction within each frame, and a peak value of one line of the signal S9 within each frame is held. To the integrating circuits 232, 233, 234, 235, 236 and 237 are inputted the output of the line peak hold circuit 231 and the line E/O signal which is a signal for making a discrimination between even-number-th and odd-number-th horizontal lines. At the same time, the L frame signal of the window generator circuit 254 is inputted to the integrating circuits 232 and 235. The C frame signal of the window generator circuit 254 is inputted to the integrating circuits 233 and 236. The R frame signal of the window generator circuit 254 is inputted to the integrating circuits 234 and 237. The integrating circuit 232 is initialized by the reset signal LR1 at the upper left leading part of the focus adjusting L frame. Then, the integrating circuit 232 adds the output of the line peak hold circuit 231 to its internal register immediately before the end of even-number lines within each frame. A peak-held value thus obtained is caused by the data transfer signal IR1 to be transferred to a buffer 238 to form a line peak integral evaluation value.

The integrating circuit 233 is initialized by the reset signal CR1 at the upper left leading part of the focus adjusting C frame. Then, the integrating circuit 233 adds the output of the line peak hold circuit 231 to its internal register immediately before the end of even-number lines within each frame. A peak-held value thus obtained is caused by the data transfer signal IR1 to be transferred to a buffer 239 to form a line peak integral evaluation value. The integrating circuit 234 is initialized by the reset signal RR1 at the upper left leading part of the focus adjusting R frame. Then, the integrating circuit 234 adds the output of the line peak hold circuit 231 to its internal register immediately before the end of even-number lines within each frame. A peak-held value thus obtained is caused by the data transfer signal IR1 to be transferred to a buffer 240 to form a line peak integral evaluation value.

While the integrating circuits 232, 233 and 234, perform adding processes on data of even-number lines, the integrating circuits 235, 236 and 237 perform adding processes on data of odd-number lines, and transfer the respective results of the adding processes to buffers 241, 242 and 243.

The signal S7 is also supplied to peak hold circuits 219, 220 and 221, a line maximum value hold circuit 244 and a line minimum value hold circuit 245. The L frame signal outputted from the window generator circuit 254 is inputted to the peak hold circuit 219. The peak hold circuit 219 is initialized by the reset signal LR1 at the upper left leading part of the L frame and peak-holds the signal S7 within each frame. The result of peak holding is caused to be transferred to a buffer 222 by the data transfer signal IR1 to form a Y peak evaluation value.

The C frame signal outputted from the window generator circuit 254 is inputted to the peak hold circuit 220. The peak hold circuit 220 is initialized by the reset signal CR1 at the upper left leading part of the C frame and peak-holds the signal S7 within each frame. The result of peak holding is caused by the data transfer signal IR1 to be transferred to a buffer 223 to form a Y peak evaluation value. The R frame signal outputted from the window generator circuit 254 is inputted to the peak hold circuit 221. The peak hold circuit 221 is likewise initialized by the reset signal RR1 at the upper left leading part of the R frame and peak-holds the signal S7 within each frame. The result of peak holding is caused by the data transfer signal IR1 to be transferred to a buffer 224 to form a Y peak evaluation value.

The L, C and R frame signals outputted from the window generator circuit 254 are inputted to the line maximum value hold circuit 244 and the line minimum value hold circuit 245. The circuits 244 and 245 are arranged to be initialized at the start point in the horizontal direction of each frame and to hold the maximum and minimum values of one line of the signal S7 obtained within each frame. The maximum and minimum values thus held are inputted to a subtracter 246, which then performs a subtracting operation to obtain a "maximum–minimum" signal S10. The signal S10 is inputted to peak hold circuits 247, 248 and 249. The L frame signal outputted from the window generator circuit 254 is inputted to the peak hold circuit 247. The peak hold circuit 247 is initialized by the reset signal LR1 at the upper left leading part of the L frame and peak-holds the signal S10 within each frame. The data transfer signal IR1 causes the result of the peak holding action to be transferred to a buffer 250 to form a Max–Min evaluation value.

The C frame signal outputted from the window generator circuit 254 is inputted to the peak hold circuit 248. The peak hold circuit 248 is initialized by the reset signal CR1 at the upper left leading part of the C frame and peak-holds the signal S10 within each frame. Then, the data transfer signal IR1 causes the result of the peak holding action to be transferred to a buffer 251 to form a Max–Min evaluation value. The R frame signal outputted from the window generator circuit 254 is likewise inputted to the peak hold circuit 249. The peak hold circuit 249 is initialized by the reset signal RR1 at the upper left leading part of the R frame and peak-holds the signal S10 within each frame. The data transfer signal IR1 causes the result of peak holding to be transferred to a buffer 252 to form a Max–Min evaluation value.

At the same time that the data is transferred at each part of the data transfer signal IR1 to the buffer 222, 223, 224, 228, 229, 230, 238, 239, 240, 241, 242, 243, 250, 251 or 252, the window generator circuit 254 sends an interruption signal to the camera-body microcomputer 114. Upon receipt of the interruption signal, the camera-body microcomputer 114 reads through the microcomputer interface 253 the data from within each of the buffers before next data is transferred to the buffer after completion of a lower frame. The data thus read out is transferred to the lens microcomputer 116.

The automatic focusing operation to be performed by the microcomputers by using the TE/FE peak evaluation value, the TE line peak integral evaluation value, the FE line peak integral evaluation value, the Y peak evaluation value and the Max–Min evaluation value, is next described as follows. The TE/FE peak evaluation value is an evaluation value indicating a degree of focusing. Since this evaluation value is a peak hold value, it is dependent on the object of shooting to a relatively less degree, not much affected by camera shakes or the like, and is, therefore, most suited for use in deciding a focusing degree and also in deciding a restart of focusing. The TE line peak integral evaluation value and the FE line peak integral evaluation value also indicate a degree of focusing. They are most suited in deciding the focusing direction, because they are stable having not much noises by virtue of the advantageous effect of integration. Of the TE and FE line peak integral evaluation values, the TE value is most suited for use in the neighborhood of an in-focus state as it is obtained by extracting a higher frequency component. On the other hand, the FE value is most suited for use at the time of a greatly blurred state deviating much from an in-focus state.

The Y peak evaluation value and the Max–Min evaluation value are dependent on the object of shooting but not much on the degree of focusing. Therefore, these values are most suited for grasping the state of the object in deciding a focusing degree, in deciding a restart of focusing and in deciding the direction of focusing. More specifically, the Y peak evaluation value is used in making a discrimination between a high luminance object and a low luminance object. The Max–Min evaluation value is used in deciding a degree of contrast. Control can be appositely carried out by predicting the sizes of hills of the TE/FE peak evaluation value, the TE line peak integral evaluation value and the FE line peak integral evaluation value and by putting in necessary corrections. These evaluation values are transferred from the camera-body 128 to the lens unit 127 to have an automatic focus adjusting action executed by the lens microcomputer 116 within the lens unit 127.

Operation of the optical zooming and the electronic zooming with priority given to the operation of the zoom ring 601 disposed on the side of the lens unit 127 is next described below with reference to FIGS. 13, 14 and 15.

Figure 13:
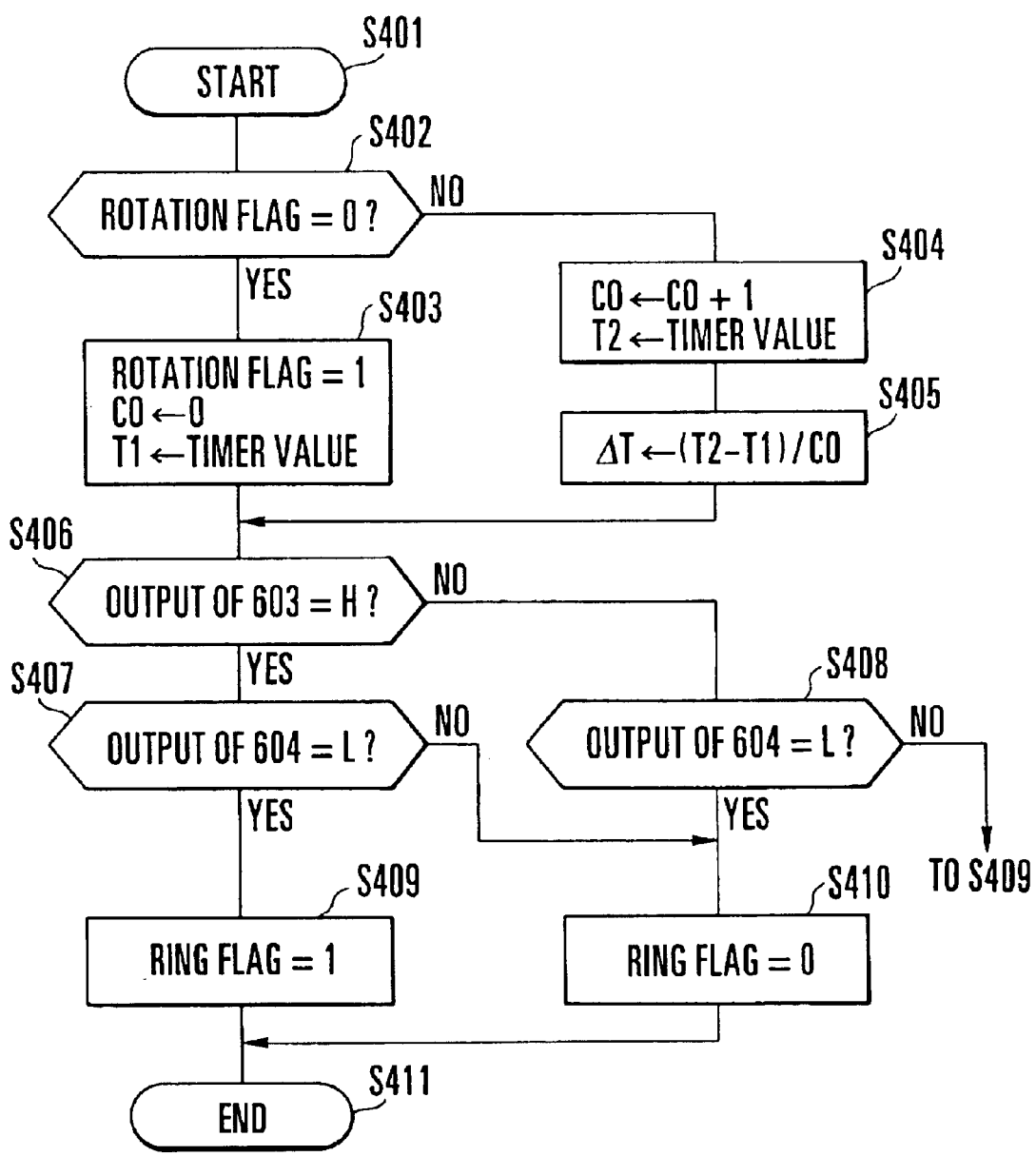
FIG. 13 shows in a flow chart zoom ring rotation detecting processes executed by a lens microcomputer.

FIG. 13 is a flow chart showing processes to be executed within the lens microcomputer 116 for detecting the rotation of the zoom ring 601. FIG. 14 is a flow chart showing processes to be executed within the lens microcomputer 116 for the optical zooming. FIG. 15 is a flow chart showing processes to be executed within the camera-body microcomputer 114 for the electronic zooming. Further, the movable lens of the zooming lens is limited by some process routine which is not shown in FIGS. 13 and 14 but is set within the lens microcomputer 116. Therefore, even if a moving instruction is given by the zoom ring 601, the zooming lens cannot be moved to any position located beyond the wide-angle end and the telephoto end. The camera-body microcomputer 114 is likewise arranged to limit the range of magnifying rates of the electronic zooming, from one magnification which is obtained with the electronic zooming function turned off up to two magnifications, and any electronic zooming outside of this range is inhibited.

The direction of rotation of the zoom ring 601 and a length of time required in moving the zoom ring 601 to a unit angle of rotation are detected by the processes of the lens microcomputer 116 as shown in FIG. 13. The operation shown in FIG. 13 is an interruption process routine to be executed within the lens microcomputer 116. The interruption is allowed to start at a change-over point in the output waveform voltage of the ring rotation detecting encoder part 602 (see FIG. 8). The interruption takes place at a rise edge and a fall edge of the output of the light projecting-and-receiving part 603 as shown in FIGS. 10(*a*) and 10(*b*) to execute the processes shown in FIG. 13. The processes shown in FIGS. 14 and 15 are executed in synchronism with a vertical synchronizing signal or the like.

Referring to FIG. 13, the flow of interruption processes begins at a step S401. At a step S402, a check is made to find if a rotation flag is at "0". If so, the flow comes to a step S403. At the step S403, the rotation flag is set at "1", a counter Co arranged to count a number of times of interruption is cleared, and a current timer value is stored in a memory T1. The term "timer value" as used here means the count value of a free running counter or the like which is generally provided for a microcomputer and is arranged to count the system clock pulse signal of the microcomputer in a cycle obtained by frequency dividing the clock signal. The term "rotation flag" as used here means a flag arranged to indicate that the zoom ring 601 has rotated, and is used in judging whether or not the zoom ring 601 has been rotated by the processes of FIG. 14. The rotation flag is cleared when the zooming lens is rotated according to the rotation of the zoom ring 601. In other words, the rotation flag indicates whether the zoom ring 601 has rotated during one vertical synchronizing period which is the processing cycle of the flow shown in FIG. 14.

At a step S406 after the step S403, a check is made to find whether the current interruption is made at a rise edge or a fall edge of the output of the light projecting-and-receiving element 603, shown in FIGS. 10(*a*) and 10(*b*). If the interruption is judged to be made at a rise edge, the flow proceeds to a step S407. At the step S407, a check is made to find if the level of the output of the light projecting-and-receiving element 604, shown in FIGS. 10(*a*) and 10(*b*), is low. If so, the two outputs mentioned above are in a combination as shown in FIG. 10(*a*), and the flow proceeds to a step S409. At the step S409, a ring flag which is arranged to indicate that the rotating direction of the zoom ring 601 is toward the wide-angle end is set at "1", and then the flow comes to an end at a step S411. If the level of the output of the light projecting-and-receiving element 604 is found to be high (Hi) at the step S407, the combination of the two outputs is as shown in FIG. 10(*b*), and then the flow proceeds to a step S410. At the step S410, the ring flag is cleared as the rotating direction of the zoom ring 601 is judged to be toward the telephoto end. In a case where the edge of the output of the light projecting-and-receiving element 603 being checked is found at the step S406 to be a fall edge, the flow proceeds to a step S408. At the step S408, a check is made to find if the level of the light projecting-and-receiving element 604 is low. If so, the flow proceeds to the step S410 to clear the ring flag to "0". If not (if high), the flow proceeds to the step S409 to set the ring flag at "1".

After completion of the flow of processes shown in FIG. 13, if the zoom ring 601 continues to rotate before the commencement of the flow of processes shown in FIG. 14, the interruption again takes place and the processes of FIG. 13 is executed once again. However, in this case, the flow begins from a step S404 as the rotation flag is judged at the step S402 to have already been set. At the step S404, the count value of the counter Co which counts the number of times of the interruption is incremented, and a current timer value is stored in a memory T2. At a step S405, a difference between the last timer value and the current timer value (T2−T1) is obtained. The difference is divided by the count value of the counter Co to obtain a length of time required in rotating the zoom ring 601 to an extent corresponding to one half period of the comb teeth of the encoder part 602 of the zoom ring 601. The time data thus obtained is stored in a memory ΔT. After that, the processes of the steps from the step S406 are executed. When the interruption takes place again while the rotation flag still remains in its set state, the interruption number-of-times count value Co is incremented to become "2". Then, the difference value T2−T1 becomes a rotation time for one period of the comb teeth, and the memory ΔT comes to show an average time required in rotating one half period.

Figure 14:
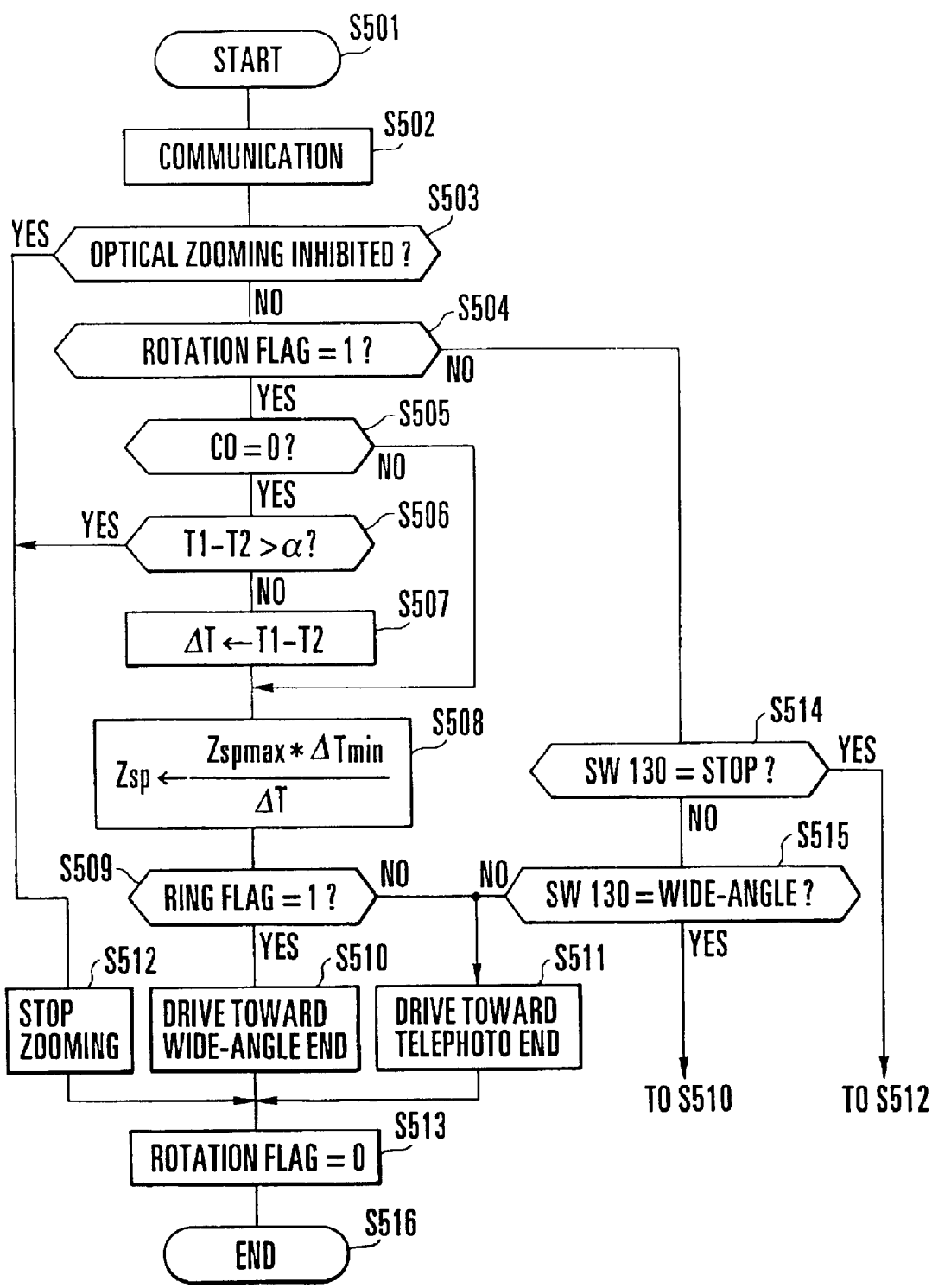
FIG. 14 shows in a flow chart optical zooming processes executed by the lens microcomputer.
Figure 15:
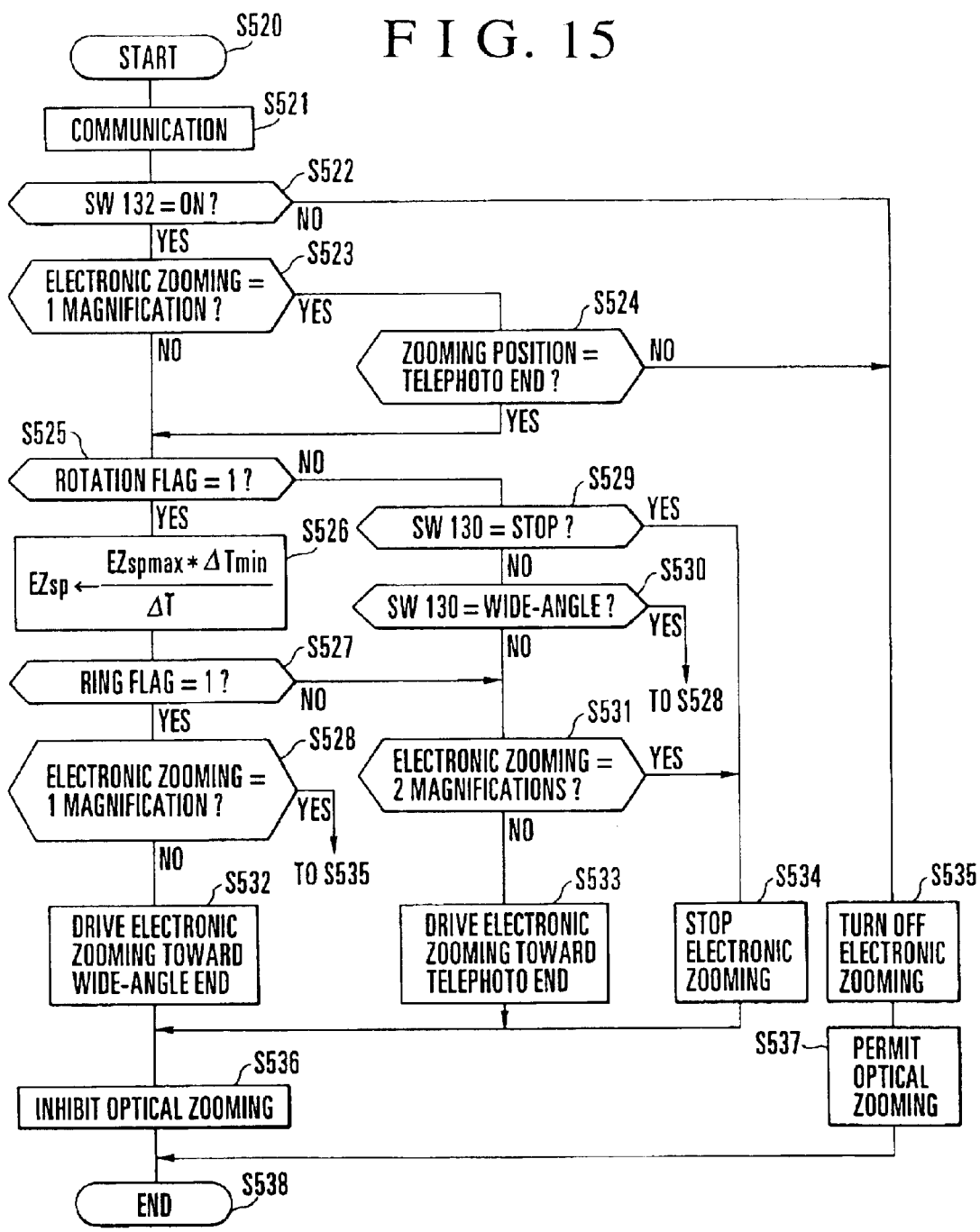
FIG. 15 shows in a flow chart electronic zooming processes executed by a camera-body microcomputer.

With the zoom ring 601 rotated, the flow of processes shown in FIG. 14 is carried out in synchronism with the vertical synchronizing signal while the flow of FIG. 13 is still in process. Referring to FIG. 14, the lens microcomputer 116 begins the flow of processes at a step S501. At a step S502, communication is conducted between the lens microcomputer 116 and the camera-body microcomputer 114. As mentioned in the foregoing, the key information on the zoom switch 130 and the AF on/off switch 131, the AF evaluation value and the optical zooming inhibiting information are sent from the camera-body microcomputer 114 to the lens microcomputer 116. At a step S503, a check is made to find if the optical zooming is inhibited. If so, the flow proceeds to a step S512 to inhibit any zooming action. If the optical zooming is allowed, the flow proceeds to a step S504 so as to give priority to the operation of the zoom ring 601 on the side of the lens unit 127. At the step S504, a check is made to find if the rotation flag is set (at "1"). If the rotation flag is found to be not set, indicating the zoom ring 601 is not operated, the flow proceeds to steps S514 and S515 to make checks for the operated state of the zoom switch 130. Then, at steps S510, S511 and S512, while the variator lens 102 is caused to be moved according to the operated state of the zoom switch 130, the focusing lens 105 is caused to carry out a compensating action according to the cam locus tracing (tracking) method described in the foregoing. Further, if the AF function is in an on-state at the time of zooming, the zooming action is carried out while performing focus adjustment making reference also to the AF evaluation value. Here, the AF action routine is not shown.

If the zoom ring 601 is decided at the step S504 to have rotated during one previous vertical synchronizing period, the flow proceeds to a step S505. At the step S505, a check is made to find if the number-of-times-of-interruption counter Co is in a cleared state. If so, it indicates that the zoom ring 601 has not been rotated by the current rotation to an extent corresponding to one half comb tooth period of the encoder part 602 and, therefore, the flow proceeds to a step S506. At the step S506, a check is made to find if a difference value T1−T2 is larger than a predetermined value α. In a case where the zoom ring 601 has continuously rotated over several previous vertical synchronizing periods, a timer value obtained when the zoom ring 601 rotated several vertical synchronizing periods before is stored in the memory T2 at the step S404 in FIG. 13. Meanwhile, a timer value obtained when the zoom ring 601 rotated within the current one vertical synchronizing period is stored in the memory T1 at the step S403 in FIG. 13. Therefore, in this case, the difference T1−T2 is only at a relatively small value. However, if the memory T2 was updated scores of vertical synchronizing periods before, the difference T1−T2 is at a large value, indicating that the zoom ring 601 has been in repose over scores of vertical synchronizing periods.

In case where the difference T1−T2 is at a small value, the zoom ring 601 can be decided to be slowly rotating. The above-stated predetermined value α is a threshold value for this decision. The difference T1−T2 actually obtained at the time of rotation at a slow speed is determined by the comb tooth pitch of the encoder part 602 and a speed at which the operator is slowly rotating the zoom ring 601. Therefore, the value α is determined on the basis of a difference value T1−T2 considered to be actually obtained. If the zoom ring 601 is judged at the step S506 to be not continuously rotated, the flow proceeds to a step S512 to bring the zooming action to a stop. If the zoom ring 601 is judged to be continuously rotated, the flow proceeds to a step S507. At the step S507, the difference value T1−T2 is stored in the memory ΔT. At a step S508, a zoom moving speed Zsp corresponding to the rotating speed of the zoom ring 601 is computed. The speed Zsp can be expressed as "$Zsp=(Zspmax*\Delta Tmin)/\Delta T$", wherein Zspmax represents a maximum speed at which the variator lens 102 can be moved without causing the compensating action of the focus motor 125 to come out of control at every focal length, and ΔTmin represents a length of time required for one half comb tooth period determined by the comb tooth pitch and a rotation load when the zoom ring 601 is rotated by the operator at a maximum speed, i.e., a minimum length of time required for the half comb tooth period. In other words, when the operator rotates the zoom ring 601 at the highest speed (ΔTmin=ΔT), the speed Zsp becomes Zspmax to cause the variator lens 102 to move at a maximum speed allowable at a currently obtained focal length. The moving speed of the variator lens 102 according to the rotating speed of the zoom ring 601 is thus determined by the above-stated steps up to the step S508.

At a step S509, a check is made to find if the ring flag is set. At steps S509 to S511, the variator lens 102 is driven either toward the wide-angle end or toward the telephoto end according to the state of the ring flag. Further, as mentioned in the foregoing, the focusing lens 105 is also driven for the purpose of correcting the focal plane according to the movement of the variator lens 102. If the count value of the counter Co is found to be not "0" at the step S505, the flow proceeds from the step S508 directly to the step S508. At the step S508, by using the value ΔT obtained at the step S405 in FIG. 13, a moving speed of the variator lens 102 is obtained by computation from an average rotation time per half-comb-tooth period mentioned above. After the steps S510 to S512, the flow proceeds to a step S513 to clear the rotation flag. At a step S516, the flow of processes comes to an end. Further, although it is not explicitly mentioned here, the speed of the optical zooming by the zoom switch 130 of the camera body 128 may be a fixed predetermined speed or may be a multiple speed variable according to pushing pressure, if the zoom switch is of a volume or multi-contact type arranged to vary its output voltage according to the pressure of a pushing operation.

The arrangement of performing the optical zooming by giving priority to a zooming operation member disposed on the side of the lens unit 127 under the lens microcomputer 116, with a rotary member such as the zoom ring 601 arranged as the zooming operation member, enables an inner-focus type zoom lens to smoothly carry out a zooming action according to the operated state of the zoom ring 601 without impairing such a zooming operability that is available by a front-lens focus type zoom lens. In accordance with the arrangement described above, therefore, an interchangeable lens system can be arranged to advantageously have the features of an inner-focus type zoom lens to permit reduction in cost and weight of the system.

The electronic zooming action to be carried out on the side of the camera body 128 is next described. Referring to FIG. 15, the camera-body microcomputer 114 begins to operate at a step S520. At a step S521, communication is conducted with the lens microcomputer 116 to receive information on the position of the variator lens 102 and the operated state of the zoom ring 601. At a step S522, the operated state of an electronic zoom on/off switch 132 which is disposed on the side of the camera body 128 is read. If the switch 132 shows an off-state, the flow of operation of the camera-body microcomputer 114 proceeds to a step S535 to turn off the electronic zooming function. At a step S537, optical-zooming-permitting or -inhibiting information, which is to be communicated to the lens microcomputer 116, is set to a permitting mode. If the switch 132 is found at the step S522 to be in its on-state, the flow proceeds to a step S523. At the step S523, a check is made to find if the current magnifying rate of the electronic zooming is one magnification, indicating that an image picked up has not been electronically enlarged as yet. If so, the flow proceeds to a step S524. At the step S524, lens position information received through the communication is checked to find if the variator lens 102 is already at its telephoto end position. If not, the flow proceeds to the steps S535 and S537 to permit the optical zooming without actuating the electronic zooming function.

If the variator lens 102 is judged at the step S524 to be already at the telephoto end position, the flow proceeds from the step S524 to a step S525 to decide the execution of an image-magnifying-rate varying action by the electronic zooming according to the operated state of the zoom ring 601 or the zoom switch 130. If it is judged at the step S523 that an image plane enlarging action has already been performed by the electronic zooming, the flow proceeds from the step S523 directly to the step S525 to execute the processes described above. In the case of this embodiment, the electronic zooming is inhibited when the variator lens 102 is not located at the telephoto end position, because the telephoto end position is arranged to be a switch-over point between the optical zooming and the electronic zooming as stated in the foregoing. This embodiment is assumed to be arranged to give an image with the best image quality at a set angle of view and to have no angle-of-view area where the optical zooming and the electronic zooming overlap each other.

At the step S525, for the purpose of performing the electronic zooming by giving priority to the operation of the zoom ring 601 on the side of the lens unit 127, a check is made for the state of the rotation flag which indicates the rotated state of the zoom ring 601 received through the communication. If the rotation flag is found to be set, the flow proceeds to a step S526 to execute the process of giving priority to the operation of the zoom ring 601. If the rotation flag is found to be in a cleared state, the flow proceeds to steps S529 and S530 to read the state of the zoom switch 130 and to make a check for the operated state of the zoom switch 130. If the zoom switch 130 is found to be not operated, the flow proceeds to a step S534 to stop the magnifying rate from being varied by the electronic zooming and to keep the current enlarging rate unchanged. With the zoom switch 130 found at the step S529 to be operated, the flow proceeds to the step S530 to find if the operated state of the zoom switch 130 indicates an instruction for moving toward the wide-angle end position. If so, the flow branches to a step S528. At the step S528, a check is made to find if the enlarging rate is already at one magnification. If not, the flow proceeds to a step S532 to reduce the enlarged rate of the picked-up image by driving the electronic function toward the wide-angle position. If so, it is not necessary to reduce the size of the picked-up image and, therefore, the flow proceeds to the step S535 to turn off the electronic zooming function. At the step S537, the camera-body microcomputer 114 permits the optical zooming to be performed if the operator wishes to set a wider angle of view.

In a case where the state of the zoom switch 130 is found at the step S530 to indicate an instruction for moving toward the telephoto end position, the flow proceeds to a step S531. At the step S531, a check is made to find if the enlarging rate is already two magnifications. If not, the flow proceeds to a step S533 to increase the enlarging rate of the picked-up image by driving the electronic zooming function toward the telephoto end position. If so, it is not necessary to enlarge the picked-up image any further and, therefore, the flow proceeds to the step S534 to bring the process of varying the magnifying rate by the electronic zooming to a stop. The current enlarging rate of two magnifications is thus kept unchanged. The picked-up image is enlarged by electronic zooming in each of the cases where the flow passes through the steps S532, S533 and S534. Therefore, in each of these cases, the flow of processes comes to an end at a step S538 after a shift to the optical zooming is inhibited at the step S536. Further, in the case of passing through the steps S523, S524, S525, S529 and S534, the optical zooming is inhibited while the enlarging rate is left at one magnification. In this case, the time of permitting the optical zooming in response to a zooming operation will be delayed as much as one vertical synchronizing period. However, this amount of delay presents no problem in the actual interlocked state of a zooming operation and a zooming movement in response thereto.

If the zooming ring 601 is judged at the step S525 to have rotated, on the other hand, the flow proceeds to a step S526. At the step S526, a moving speed EZsp of the electronic zooming corresponding to the operation speed of the zoom ring 601 is computed, in accordance with a formula: EZsp= (EZspmax*ΔTmin)/ΔT, wherein EZspmax represents a speed of moving by the electronic zooming required for retaining an angle-of-view varying rate obtained by the optical zooming in the neighborhood of the telephoto end at the speed Zspmax mentioned in the description of the step S508 in FIG. 14, and ΔTmin represents a length of time required for one half comb tooth period determined by the comb tooth pitch and a rotation load when the zoom ring 601 is rotated by the operator at a maximum speed, i.e., a minimum length of time required for the half comb tooth period. In other words, when the operator rotates the zoom ring 601 at the highest speed (ΔTmin=ΔT), the speed EZsp becomes the speed EZspmax to determine the moving speed of the electronic zooming at the same varying rate as the angle-of-view varying rate obtained in the neighborhood of the telephoto end position while the variator lens 102 moves at a maximum speed allowable. With the moving speed of the electronic zooming thus determined, the flow proceeds to a step S527 to check the ring flag for the rotating direction of the zoom ring 601. If the ring flag is found to have been set, the flow proceeds to the step S528 to move the electronic zooming toward the wide-angle end. If not, the flow proceeds to the step S531 to move the electronic zooming toward the telephoto end. After that, the electronic zooming processes are executed in the same manner as the steps described in the foregoing.

According to the arrangement of performing the electronic zooming under the control of the camera-body microcomputer 114 with priority given to the zooming operation member disposed on the side of the lens unit, information on permission and inhibition of the optical zooming, information on the lens positions and information on the operated state of the zooming operation member on the side of the lens unit are exchanged between the lens unit 127 and the camera body 128, and the electronic zooming is carried out on the basis of the information thus exchanged. Therefore, an interchangeable lens system can be arranged to be capable of smoothly carrying out the electronic zooming while retaining the best image quality at an angle of view used for shooting.

Second Embodiment

Figure 16:
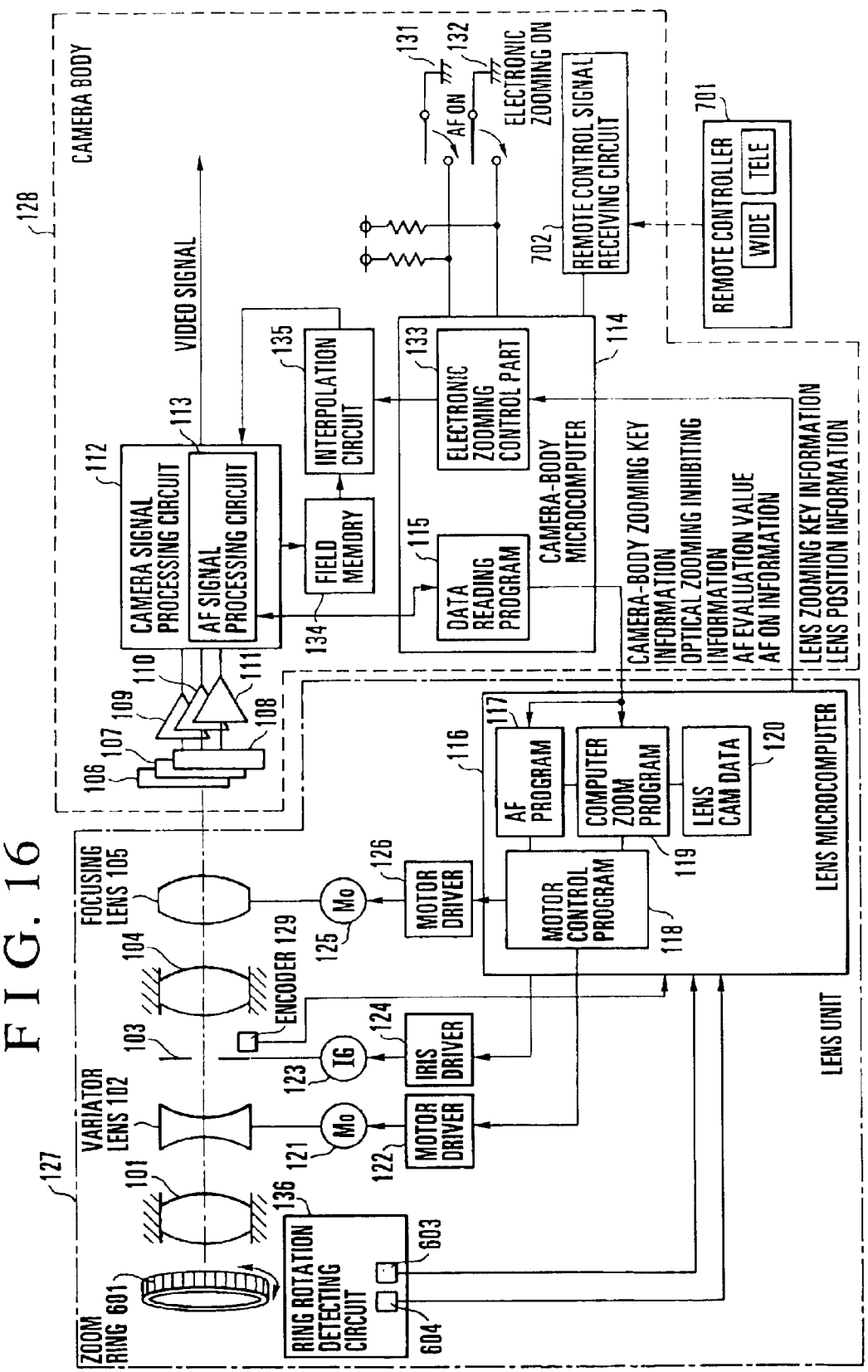
FIG. 16 shows in a block diagram the arrangement of a second embodiment of the invention.

FIG. 16 is a block diagram showing a second embodiment of the invention. In the case of the first embodiment described above, the information on the operated state of the zoom switch 130 which is mounted directly on the camera body 128 is used as zoom key information to be delivered from the camera body 128 to the lens unit 127. The second embodiment is, on the other hand, arranged to use information on the operated state of a zooming operation member which is not directly mounted on the camera body 128.

Referring to FIG. 16, an external remote controller 701 is provided with zoom keys and is arranged to send a remote operation command to the camera body 128 by emitting an infrared light in a pulse like manner. A remote control signal receiving circuit 702 is connected to the camera-body microcomputer 114. Other parts of the second embodiment shown are arranged in the same manner as the parts of the first embodiment shown in FIG. 7. When a command is sent from the remote controller 701, the command is converted into an electrical signal by a light receiving element disposed in the remote control signal receiving circuit 702. The electrical signal is sent to the camera-body microcomputer 114 to enable the camera-body microcomputer 114 to know the state of a zooming operation of the remote controller 701. The information on the state of the zoom switch of the remote controller 701 is sent from the camera-body microcomputer 114 to the lens microcomputer 116, and a control operation is performed in the same manner as in the case of the first embodiment.

Further, while the external remote controller 701 is arranged to be of an infrared light emitting type, the signal transmitting means may be arranged to have light, electric waves or electric signals transmitted through some wiring connection or the like.

Third Embodiment

Figure 17:
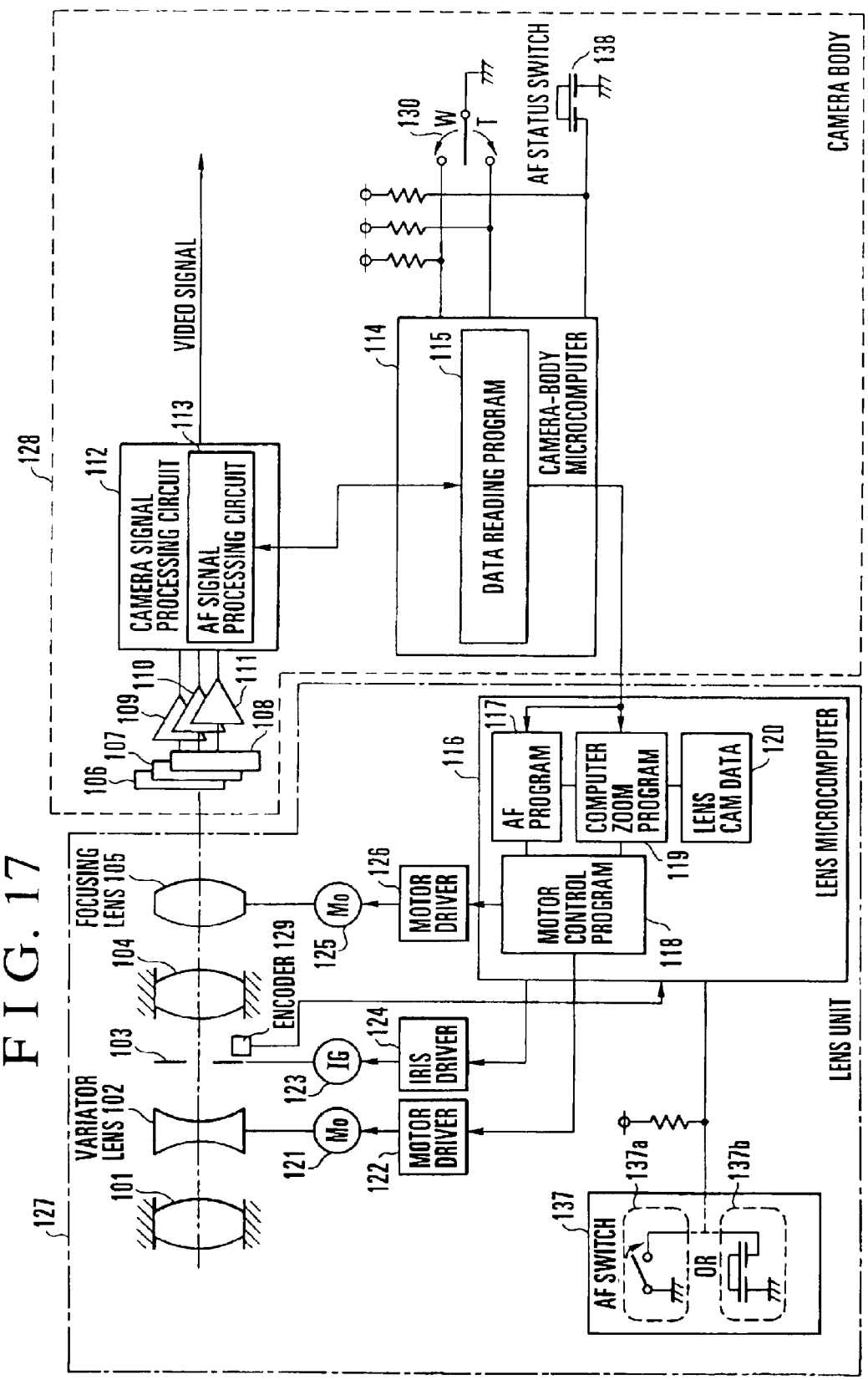
FIG. 17 shows in a block diagram the arrangement of a third embodiment of the invention.

FIG. 17 is a block diagram showing a third embodiment of the invention. In the third embodiment, parts 101 to 130 correspond to the parts indicated by the same reference numerals in FIG. 7 which shows the first embodiment. Therefore, the details of them are omitted from the following description. An AF switch 137 is disposed in the lens unit 127 and is an open/close or slide type switch 137a, or may be a push type trigger switch 137b. An AF status switch 138 is disposed on the side of the camera body 128.

With the third embodiment arranged as mentioned above, an AF evaluation value is formed by the AF signal processing circuit 113 in the same manner as in the case of the first embodiment shown in FIG. 7. The AF evaluation value is read out by the data reading program 115 disposed within the camera-body microcomputer 114. The AF evaluation value thus read out is transferred to the lens microcomputer 116.

Further, the camera-body microcomputer 114 reads the state of the zoom switch 130 and that of the AF status switch 138. Then, information on the state of the zoom switch 130 and trigger information indicating whether the AF status switch 138 is pushed or not are sent to the lens microcomputer 116. Upon receipt of the information, the lens microcomputer 116 controls the zooming and focusing lenses according to the information received from the camera-body microcomputer 114 and also according to the state of the AF switch 137 disposed on the side of the lens unit 127.

If the AF switch 137 is a switch 137a which is of an open/close type or a sliding type capable of retaining an operated state thereof, the lens microcomputer 116 makes a discrimination between an AF (automatic focusing) mode and an MF (manual focusing) mode according solely to the state of the AF switch 137. If the AF switch 137 is a push type switch 137b, the lens microcomputer 116 decides the AF mode or the MF mode, in a toggle-motion-like manner, according to trigger information from the AF status switch 138 or according to trigger information which indicates whether the AF switch 137 is pushed or not. In a case where the switches 138 and 137 are simultaneously operated, the AF mode or the MF mode is decided by giving priority to the operation on the AF switch 137.

In a case where the zoom switch 130 is being pushed in the MF mode, a computer zooming program 119 sends a signal to a zoom motor driver 122, on the basis of lens cam data 120 in store within the lens microcomputer 116, for driving in the direction in which the zoom switch 130 is being pushed. Then, the variator lens 102 is driven by a zoom motor 121 according to the signal. At the same time, a signal is sent to a focus motor driver 126 to cause the focusing lens 125 to be moved by a focus motor 125. A magnification varying action is thus carried out.

When the zoom switch 130 is being pushed in the AF mode, an in-focus state must be retained. Therefore, while making reference to an AF evaluation value signal sent from the camera-body microcomputer 114 as well as to the lens cam data 120 stored within the lens microcomputer 116, the computer zooming program 119 causes a magnification varying action to be carried out in such a way as to keep the AF evaluation value at its maximum value. If the zoom switch 130 is not pushed in the AF mode, an AF program 117 causes an automatic focus adjusting action to be carried out by sending a signal to the focus motor driver 126 to cause the focusing lens 105 to be moved by the focus motor 125 in such a way as to keep an AF evaluation value signal coming from the camera-body microcomputer 114 at a maximum value. Any automatic focus adjusting action is inhibited when the zoom switch 130 is not pushed in the MF mode.

Figure 18:
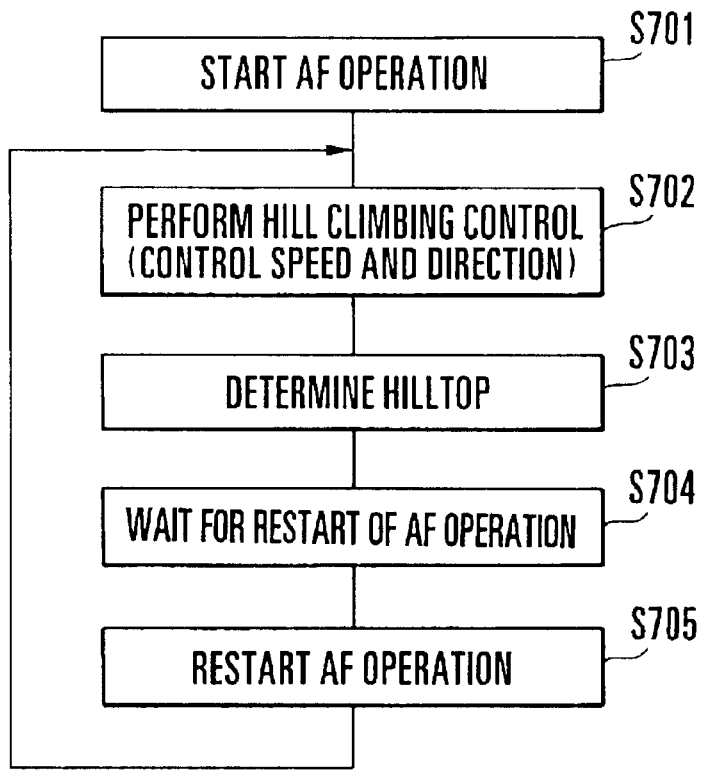
FIG. 18 shows in a flow chart AF processes executed by a lens microcomputer.

The algorithm of an automatic focus adjusting operation to be executed by the lens microcomputer 116 within the lens unit 127 is next described with reference to FIG. 18, which is a flow chart showing the flow of the operation. The automatic focus adjusting action starts at a step S701. At a step S702, a process of hill climbing control is executed by performing speed control at the peak levels of TE and FE. Direction control is performed by mainly using a TE line peak integral evaluation value in the neighborhood of a hilltop and an FE line peak integral evaluation value in the skirt area of the hill. At a step S703, a hilltop is determined on the basis of the absolute values of the TE and FE peak evaluation values and the varying amount of the TE line peak integral evaluation value. At a step S704, the control is brought to a stop at a point of highest level, and the flow waits for a restart of the automatic focus adjusting action. At a step S705, the automatic focus adjusting action restarts when the levels of the TE and FE peak evaluation values are found to have lowered. In the loop of the automatic focus adjusting operation, the degree to which the speed control is to be applied using the TE/FE peak values, the absolute level at which the hilltop is to be determined and the varying amount of the TE line peak integral evaluation value are decided on the basis of a predicted size of the hill obtained from the state of the object judged by using a Y peak evaluation value and a Max–Min evaluation value.

An algorithm of deciding the AF mode or MF mode by the lens microcomputer 116 is described below with reference to FIGS. 19 and 20.

Figure 19:
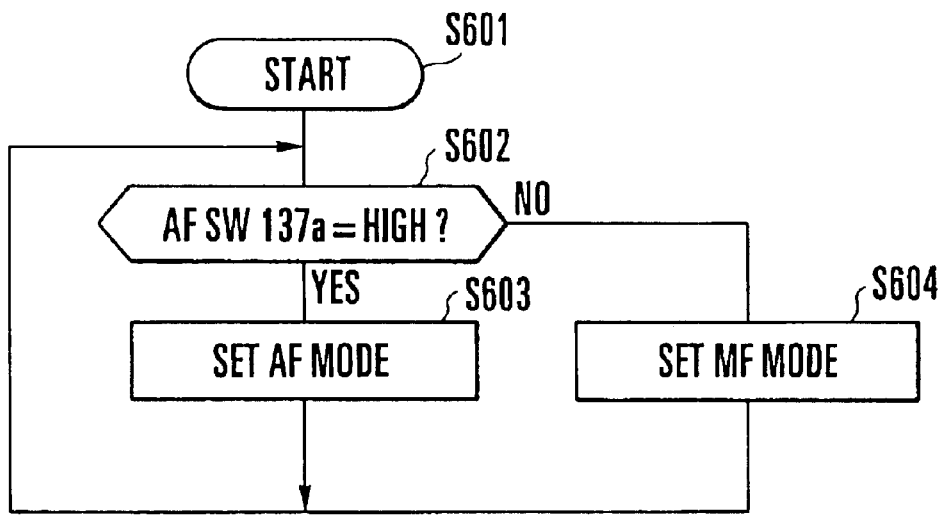
FIG. 19 shows in a flow chart AF mode setting processes executed by the lens microcomputer in a case where an AF switch employed is of an open/close type or of a sliding type.

FIG. 19 is a flow chart showing an algorithm of setting the AF mode in a case where the AF switch 137 shown in FIG. 17 is the switch 137a which is of the open/close type or the sliding type. At a step S602, a check is made to find if the output of the AF switch 137a is at a high level with the AF switch 137a not pushed. If so, the flow proceeds to a step S603 to set the AF mode. If not, the flow proceeds to a step S604 to set the MF (manual focusing) mode. After the step S603 or S604, the flow returns to the step S602 to monitor a pushing operation on the AF switch 137a.

Figure 20:
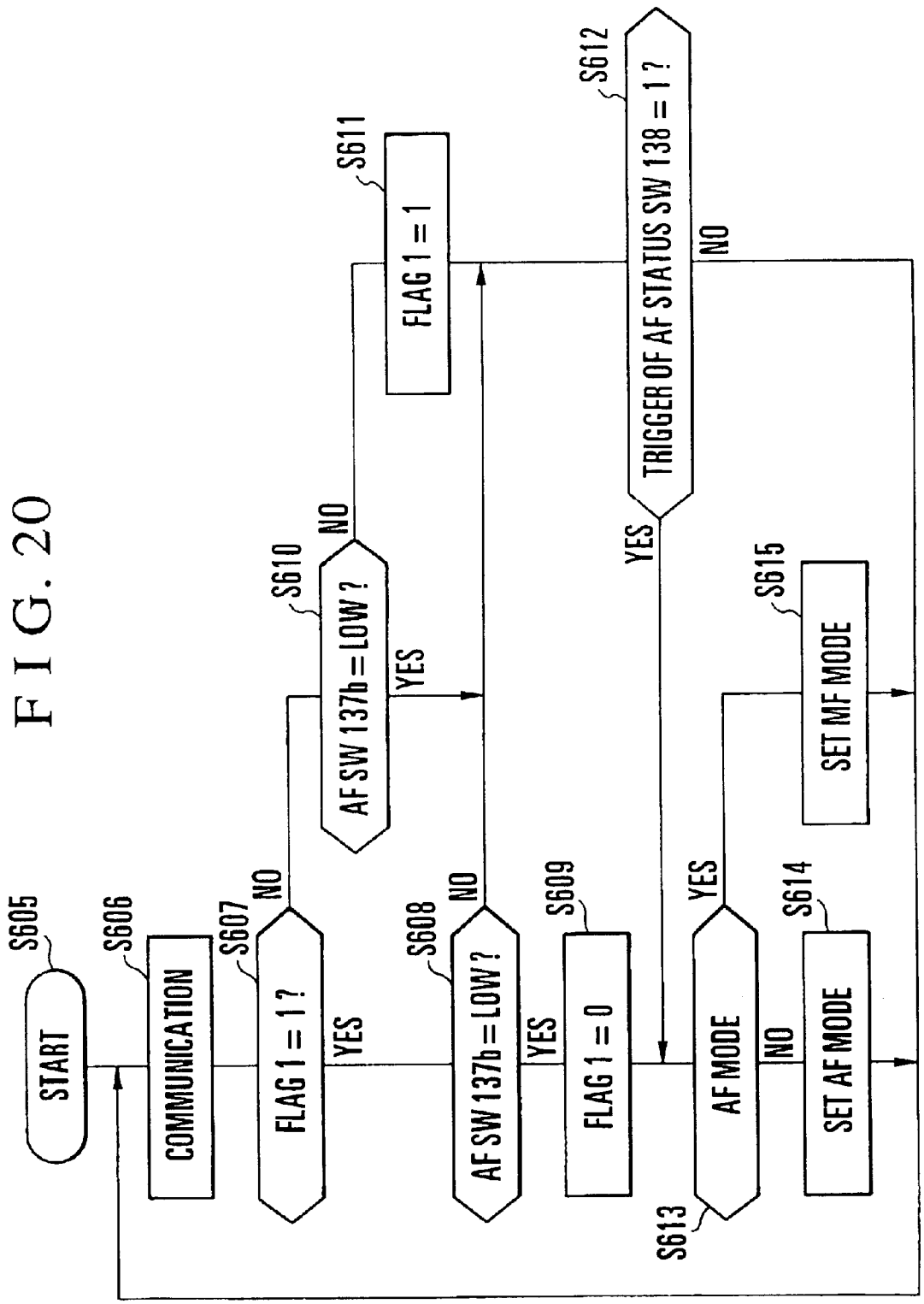
FIG. 20 shows in a flow chart AF mode setting processes executed by the lens microcomputer in a case where the AF switch employed is a trigger switch.

FIG. 20 is a flow chart showing a case where the AF switch 137 is the push type trigger switch 137b. The lens microcomputer 116 begins to execute a flow of processes at a step S605. At a step S606, communication is conducted with the camera-body microcomputer 114 to receive trigger information which indicates whether the AF status switch 138 is pushed or not. At a step S607, a check is made to find if a flag 1 which is arranged to indicate the state of the AF switch 137b last obtained is at "1". If the state of the AF switch 137b is at a high level, the flag 1 is at "1". If not, the flag 1 is at "0". In a case where the AF switch 137b has not been pushed last time and is at a high level state, the flow proceeds to a step S608. At the step S608, a check is made for the current state of the AF switch 137b. If the current state of the AF switch 137b is found to be at a low level, the AF switch 137b is considered to be pushed, and the flow proceeds to a step S609. At the step S609, the flag 1 is cleared. Then, the flow proceeds to a step S613 to carry out a toggle action for AF/MF mode change-over. At steps S613 to S615, the current AF/MF mode selection is reversed to set an opposite mode. After that, the flow returns to the step S606 to again execute subsequent steps. If the AF switch 137b is found at the step S608 to remain in its high level state, the AF switch 137b is considered to have not been operated, and the flow proceeds to a step S612.

Further, if the last state of the AF switch 137b is found at the step S607 to be at a low level, the flow proceeds to a step S610. At the step S610, a check is made for the current state of the AF switch 137b. If the state of the AF switch 137b is found to have returned to its high level, the flow proceeds to a step S611 to set the flag 1 at "1". In cases where the AF switch 137b is found at the step S610 to be still remaining in a state of being pushed or to be not so, the flow proceeds to the step S612, because, in either cases, the AF switch 137b on the side of the lens unit 127 is not pushed this time. At the step S612, a check is made for the state of the AF status switch 138 which is disposed on the side of the camera body 128.

At the step S612, the trigger information on the trigger of the AF status switch 138 which is obtained by the communication with the camera-body microcomputer 128 at the step S606 is checked to find if it is set. If the trigger is found to be at "1", the AF status switch 138 is considered to be pushed this time by the operator, and the flow proceeds to the step S613 for the steps of making the above-stated AF/MF mode change-over. If the trigger is found to be at "0", thus indicating that the AF status switch 138 is not operated this time, the flow returns to the step S606, leaving the current mode as it is. The state of the trigger sent from the camera body 128 is determined with processes similar to the steps S607 to S611 executed for the AF status switch 138 by the camera-body microcomputer 114. The trigger is set at "1", with a process similar to the step S609 included in these processes, and at "0" in a case where a process similar to the step S612 in FIG. 20 is executed.

As apparent from the description of the flows of operation shown in FIGS. 19 and 20, the camera body 128 gives priority to the AF switch 137 of the lens unit 127 in setting the AF mode because of the following reason. Interchangeable lens type cameras are generally arranged, for their operability, to have a shutter release button held by the right hand and a lens part by the left hand of the operator. Therefore, operation members are arranged at the lens part to permit operation by the left hand which is holding the lens part. In view of this, the third embodiment is arranged to give priority to the left hand operation on the AF/MF mode setting switch which is provided for control over the lens system. This arrangement permits shooting with no camera shakes nor defocusing and without missing shutter operating opportunities under any shooting conditions.

In the embodiment described above, the trigger information to be sent from the camera-body microcomputer 114 to the lens microcomputer 116 is obtained with changes taking place in the state of the AF status switch 138 detected by the camera-body microcomputer 114. In a case where an AF/MF selection switch is disposed on a remote control unit or the like, however, the trigger information may be arranged to be sent when either the AF status switch 138 or the switch of the remote control unit is pushed.

Fourth Embodiment

Figure 21:
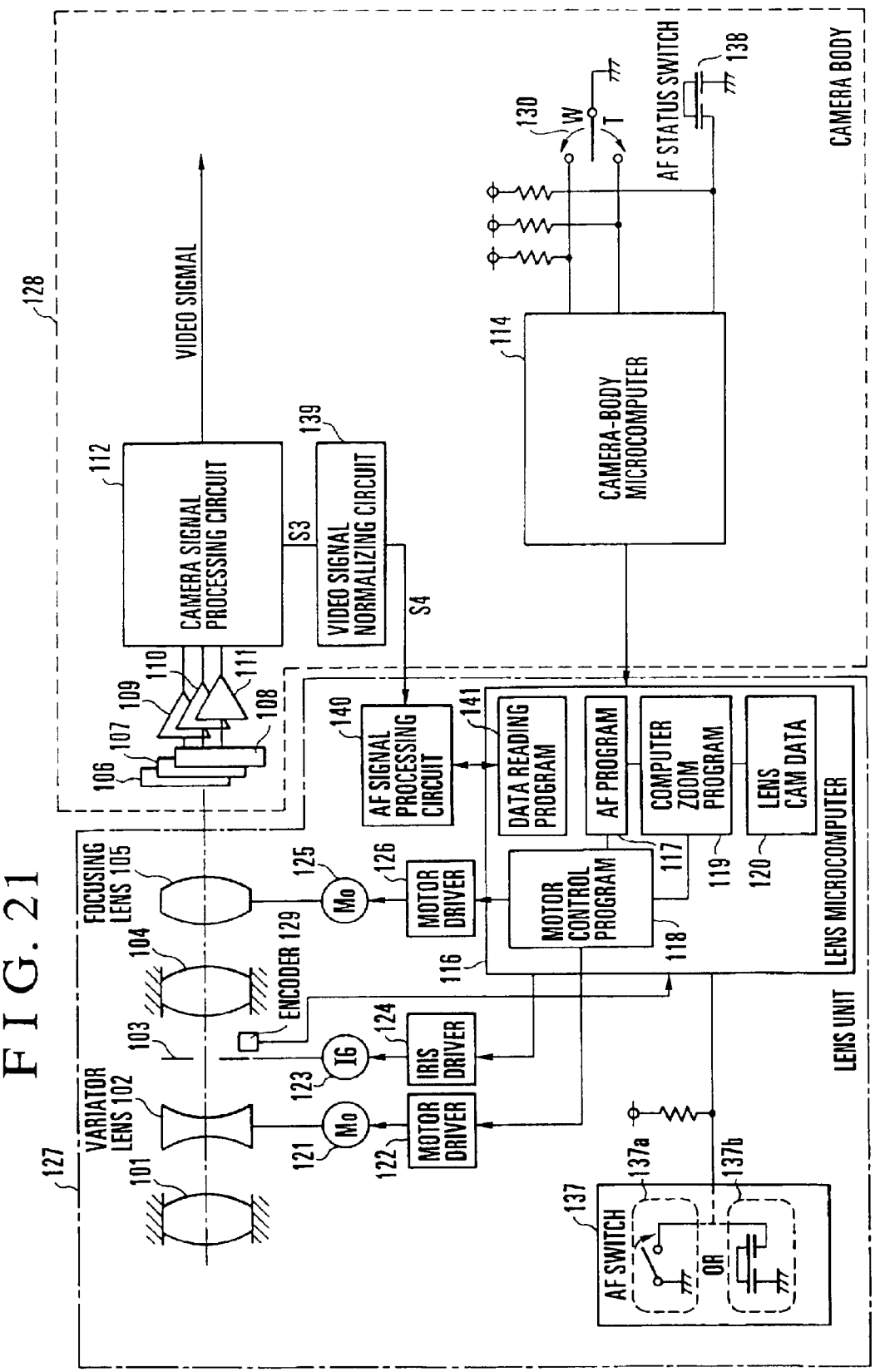
FIG. 21 shows in a block diagram the arrangement of a fourth embodiment of the invention.

FIG. 21 shows the arrangement of a fourth embodiment of the invention. In the case of the fourth embodiment, a video signal is delivered in place of an AF evaluation value from the camera body 128 to the lens unit 127, and an AF/zooming action is arranged to be carried out on the basis of an AF evaluation value which is formed within the lens unit 127. Images formed on image sensors 106, 107 and 108 are photo-electrically converted and respectively supplied to amplifiers 109, 110 and 111 to be amplified to an optimum level. The outputs of these amplifiers are inputted to a camera signal processing circuit 112 to be converted into a standard TV signal. At the same time, a video signal S3 which is formed by mixing R, B and G signals without any gamma correction process is supplied from the camera signal processing circuit 112 to a video signal normalizing circuit 139. The video signal normalizing circuit 139 is arranged to carry out a normalizing process in such a way as to cause all video signals that are obtained by shooting one and the same object with various video cameras to have the same video signal level. As a result of the process, a normalized video signal S4 is obtained. The normalized video signal S4 is supplied from the camera body 128 to the lens unit 127 via a lens mount.

On the side of the lens unit 127, the normalized video signal S4 is inputted to an AF signal processing circuit 140. The AF signal processing circuit 140 forms an AF evaluation value on the basis of the signal S4. The AF evaluation value is read out by a data reading program 141 arranged within the lens microcomputer 116. Meanwhile, the camera-body microcomputer 114 reads the state of a zoom switch 130 and that of an AF status switch 138. The camera-body microcomputer 114 sends information on the state of the zoom switch 130 and trigger information indicating whether the AF status switch 138 is pushed or not to the lens microcomputer 116. The lens microcomputer 116 then performs control in the same manner as the third embodiment according to the information from the camera-body microcomputer 114 and the state of an AF switch 137.

Figure 22:
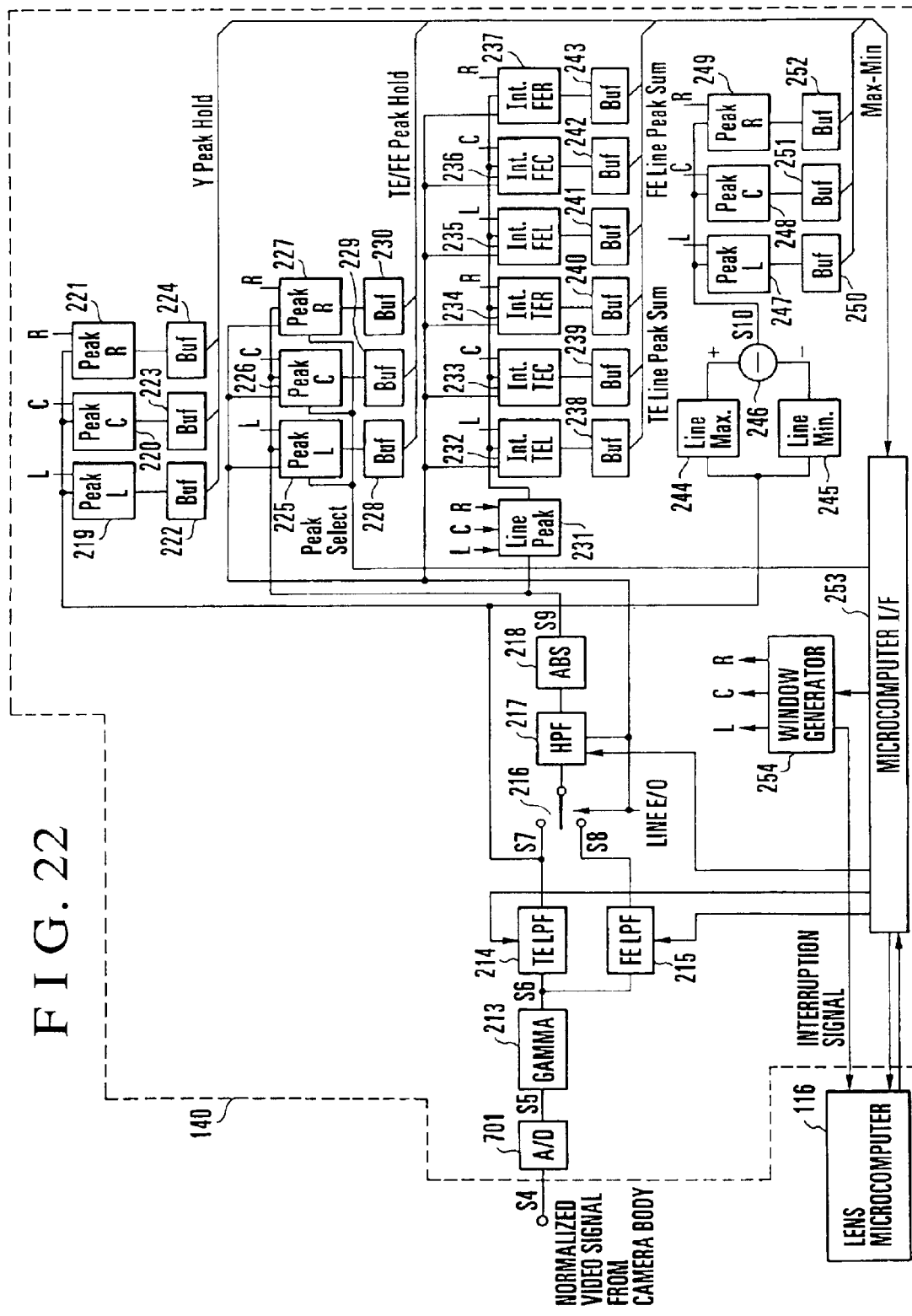
FIG. 22 shows in a block diagram the details of an AF signal processing circuit.

The AF signal processing circuit 140 in the fourth embodiment is arranged as shown in FIG. 22. The normalized video signal S4 received from the camera body 128 is converted by an A/D converter 701 into a digital signal to obtain an automatic focusing luminance signal S5. The signal S5 is supplied to a gamma circuit 213 to form an AF evaluation value in the same manner as the first and third embodiments and through processes which are similar to the processes shown in FIG. 20.

The fourth embodiment is arranged to obtain the normalized video signal S4 as an analog signal and to have the analog signal S4 converted into a digital video signal by the AF signal processing circuit 140. However, this arrangement may be changed to normalize a digital video signal outputted from the camera signal processing circuit 112 and to transfer the normalized digital video signal from the camera body 128 to the lens unit 127.

Fifth Embodiment

Figure 23:
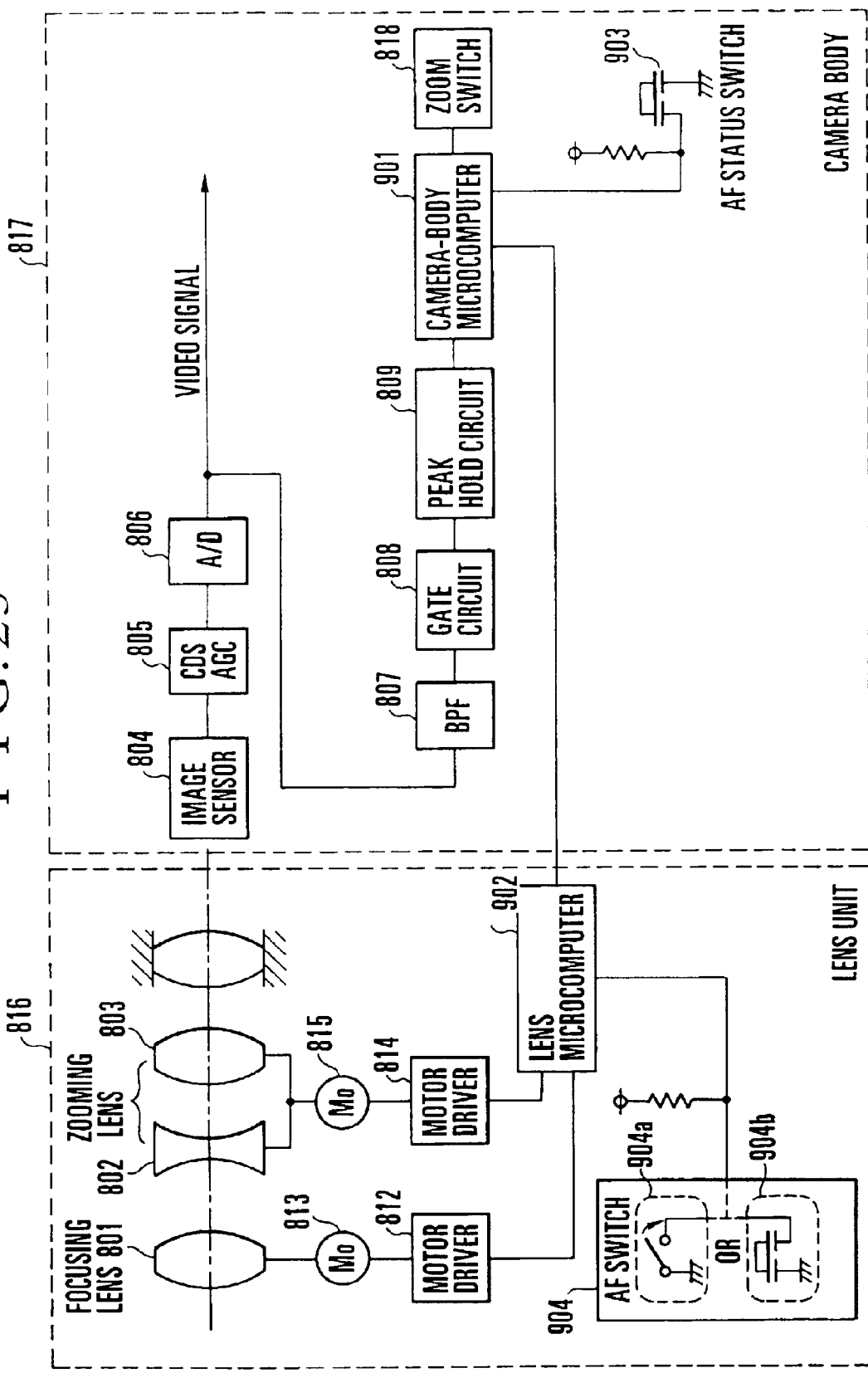
FIG. 23 shows in a block diagram the arrangement of a fifth embodiment of the invention.

FIG. 23 shows the arrangement of a fifth embodiment of the invention. In the fifth embodiment, an AF control part is provided on the side of a camera body which is arranged according to the prior art described in the foregoing, while the invention is applied to an interchangeable lens system arranged to deliver information on the driving direction and speed of a lens driving motor to a lens unit. In FIG. 23, all parts that are the same as those of FIG. 1 are indicated by the same reference numerals and the details of them are omitted from the following description.

In the interchangeable lens system shown in FIG. 23, an AF status switch 903 is disposed on the side of a camera body 817. An AF switch 904 which is either a switch 904a of an open/close type or of a slide type or a push type trigger switch 904b is disposed on the side of a lens unit 816. A lens microcomputer 902 is arranged to send information on the state of the AF switch 904 (including the type of the AF switch 904 and the state thereof) to a camera-body microcomputer 901.

The camera-body microcomputer 901 is arranged to decide selection of an AF mode or an MF mode according to the information on the AF switch 904 disposed on the side of the lens unit 816 and also according to the state of the AF status switch 903. Then, a lens control operation is carried out according to the mode selected. In the AF mode, a focusing speed is decided according to the degree of focusing and the motor driving direction is also decided, in such a way as to increase the AF evaluation value, within the camera-body microcomputer 901. Then, information on the driving speed and direction of a focus motor 813 is sent to the lens microcomputer 902. In the event of the MF (manual focusing) mode, the camera-body microcomputer 901 sends to the lens microcomputer 902 an instruction for bringing the focus motor 813 to a stop. In accordance with the instruction from the camera-body microcomputer 901, the lens microcomputer 902 makes focus adjustment through a motor driver 812 by causing the focus motor 813 to move a focusing lens 801 along an optical axis.

Figure 24:
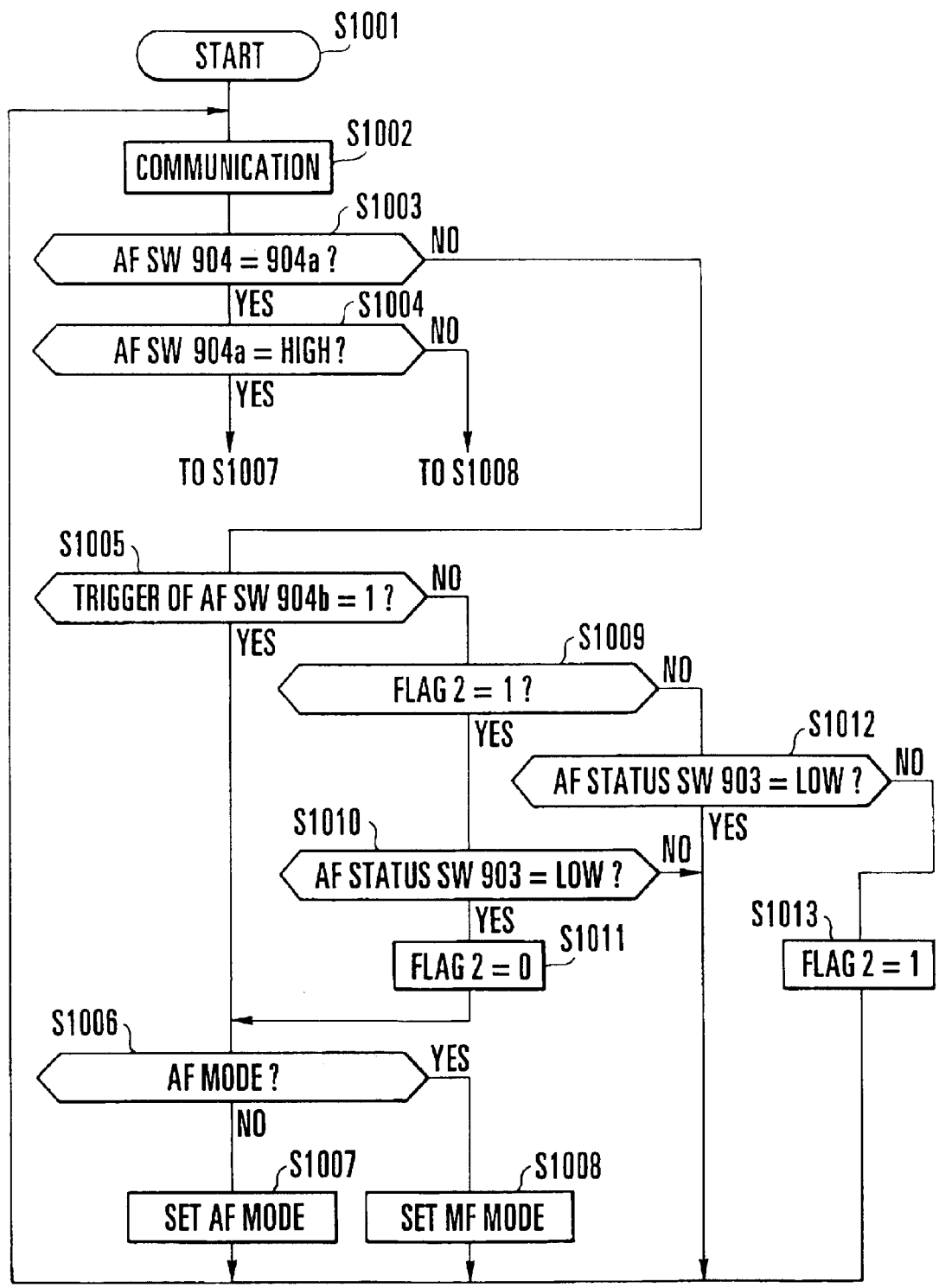
FIG. 24 shows in a flow chart AF/MF mode deciding processes executed by a camera-body microcomputer.

An AF/MF mode deciding algorithm to be executed by the camera-body microcomputer 901 is next described with reference to FIG. 24 which is a flow chart.

The camera-body microcomputer 901 begins to execute a flow of processes at a step S1001. At a step S1002, the camera-body microcomputer 901 conducts communication with the lens microcomputer 902 to receive information about the AF switch 904 disposed on the side of the lens unit 816. At a step S1003, the information received from the lens microcomputer 902 is checked to find if the AF switch 904 is the switch 904a which is of an open/close or slide type which can be operated to retain its switching state. If so, the flow of operation of the microcomputer 901 proceeds to a step S1004 to make a check for the state of the AF switch 904a and to set the AF or MF mode at a step S1007 or S1008. If the AF switch 904 is found at the step S1003 to be the trigger-information-generating push type switch 904b which is incapable of retaining its state, the flow proceeds to a step S1005. At the step S1005, a check is made for trigger information generated by the AF switch 904b to find if the trigger is at "1". If so, the flow proceeds to a step S1006 to execute a toggle action for switching the current AF or MF mode over to the opposite mode through steps S1006 to S1008.

If the trigger of the AF switch 904b of the lens unit 816 is found at the step S1005 to be in a cleared state, thus indicating that the switch 904b is not pushed, the flow proceeds to a step S1009 to execute steps S1009 to S1013 for finding whether the AF status switch 903 on the side of the camera body 817 is pushed or not and for deciding whether or not the AF/MF mode change-over is to be effected. At the step S1009, a flag 2 which indicates the state of the AF status switch 903 obtained last time is checked to find if it is at "1". The flag 2 is at "1" if the AF status switch 903 was at a high level and at "0" if the AF status switch 903 was at a low level. In a case where the AF status switch 903 was not pushed last time, the flow proceeds to a step S1010. At the step S1010, a check is made for the current state of the AF status switch 903. If the AF status switch 903 is found this time to be at a low level, the AF status switch 903 is considered to be pushed, and the flow proceeds to a step S1011. At the step S1011, the flag 2 is cleared to "0", and the flow proceeds to a step S1006 to carry out a toggle action for switching the focusing mode. At steps S1006 to S1008, the current AF or MF mode is set to the opposite mode of focusing, and then the flow returns to the step S1002 to execute the above-stated steps again. If the AF status switch 903 is judged at the step S1010 to be still at its high level, the AF status switch 903 is considered to have not been operated, and the flow returns to the step S1002.

Further, if the state of the AF status switch 903 obtained last time is judged at the step S1009 to be at a low level, the flow proceeds to a step S1012. At the step S1012, a check is made for the current state of the AF status switch 903. If the AF status switch 903 is judged to have come back to a high level from its last state, the flow proceeds to a step S1013 to set the flag 2 at "1". If either the last state of the AF status switch 903 is judged at the step S1012 to be still remaining in a state of being pushed or to be no longer in the state of being pushed, the AF status switch 903 which is disposed on the side of the camera body 817 is not pushed this time. In that case, therefore, the flow of operation returns to the step S1002, leaving the focusing mode as it is. The trigger state of the AF switch 904b sent from the lens unit 816 has been decided by the lens microcomputer 902 through a flow of processes which are similar to the steps S1009 to S1013. The trigger information is at "1" if the flow of these processes includes a process similar to the step S1011 and at "0" if the process is not included.

As mentioned in the foregoing, zooming operation means is arranged on the side of the lens unit. In a case where a lens unit of the type to be held by hand is mounted on a camera body, the arrangement enables the operator to perform a zooming operation by the lens holding hand. Therefore, camera shakes can be prevented as pictures can be taken without deforming a shooting posture. The arrangement also prevents erroneous actions resulting from groping and touching a wrong switch and also suspension of shooting in search of a switch. Since a shutter release button can be operated any time by the right hand of the operator, shooting can be carried out without missing shutter operating opportunities under any shooting conditions.

Particularly, the use of a rotary member such as a zoom ring as operation means on the side of the lens unit enables even an inner-focus type lens system to smoothly carry out a zooming action according to the operated state of the rotary member with a good zooming operability which is as good as the operability of a front-lens focus type lens system. In accordance with the arrangement disclosed, an interchangeable lens system can be arranged to give many advantages to the operator, at a low cost, in a small size and in a light weight, without impairing the intrinsic features of the inner-focus type lens system.

In a case where an electronic zooming function is provided on the side of a camera body, the use of magnification varying operation means like a zoom ring whereby a variator lens is not forcibly moved along an optical axis permits electrical control over both the electronic zooming action and the optical zooming action. Therefore, an interchangeable lens system can be arranged to be capable of carrying out a zooming action continuously from the optical zooming to the electronic zooming, while retaining the best image quality attainable at the shooting angle of view, by simply exchanging information between the lens unit and the camera body, including information on inhibition or permission of the optical zooming, information on lens positions, information on the operated state of the zooming operation means disposed on the side of the lens unit, etc.

The provision of operation means for permitting or inhibiting an AF action on the side of the lens unit enables a focusing operation to be carried out by the lens part separately from any operation of the camera part. An interchangeable lens system, therefore, can be arranged without impairing its operability to permit a smooth shooting operation at any angle of view while looking at a viewfinder, etc.

Particularly, the arrangement for giving priority to the AF/MF mode selecting action by operating means disposed on the side of the lens unit enables the left hand of the operator to operate every part of the lens system with manual zooming and focusing parts disposed on the side of the lens unit. Therefore, camera shakes can be prevented, because a shooting operation can be carried out without deforming a shooting posture. The arrangement also prevents erroneous actions resulting from groping and touching a wrong switch and also suspension of shooting in search of a switch. Further, since a shutter release button can be operated any time by the right hand of the operator, a shooting operation can be carried out without missing shutter-operating opportunities under any shooting conditions.

What is claimed is:

1. A lens device interchangeable to a camera body comprising:

variator lens means for performing a magnification varying action;

compensator lens means for correcting a focus condition;

lens-side operation ring member provided in said lens unit, operable by a user for causing the magnification varying action to be performed; and control means for controlling the magnification varying action by moving said variator lens means and said compensator lens means along an optical axis according to an operation of said operation ring member and according to a control signal output by camera-side operation means supplied from said camera body, wherein said control means is arranged to give a priority to a control of said variator lens means by the operation of said lens-side operation ring member over the control by the control signal output from said camera-side operation member supplied from said camera body and controls a driving speed of said variator lens means in response to an operation speed of said operation ring member.

2. A lens device according to claim 1, wherein said lens-side operation ring member comprises a rotary member rotatably disposed on a lens barrel which houses said variator lens means and said compensator lens means therein, and rotation detecting means for detecting a rotating position and a rotating direction of said rotary member, and wherein said control means is arranged to perform control according to a result of detection provided by said rotation detecting means.

3. A lens device according to claim 1, wherein said control means is arranged to perform control making reference to information on a positional relation between said variator lens means and said compensator lens means stored beforehand.

4. A lens device according to claim 1, wherein said control means is arranged to perform control on the basis of information on a positional relation between said variator lens means and said compensator lens means stored beforehand and on the basis of a focus signal supplied from said camera body.

5. A lens device according to claim 1, further comprising position detecting means for detecting a position of said variator lens means and that of said compensator lens means, and transmission means for transmitting, to said camera body, a detection output of said position detecting means and information on a state of the operation of said lens-side operation ring member.

6. An image pickup apparatus interchangeable to a lens unit thereon, comprising:

said lens unit comprising variator lens means for performing a magnification varying action, compensator lens means for compensating a focus condition, first operation means operable by a user for causing the magnification varying action to be performed, and first control means for controlling the magnification varying action by moving said variator lens means and said compensator lens means along an optical axis according to an operation of said first operation means and according to a control signal supplied from an image pickup apparatus body; and said image pickup apparatus body comprising image pickup means for obtaining an image signal by picking up an image of an object through said variator lens means and said compensator lens means, second operation means for causing the magnification varying action to be performed, and second control means for sending the control signal to said first control means according to an operation of said second operation means, wherein said first control means is arranged to give a priority to a control of said variator lens means by the operation of said first operation means over the control by the control signal generated by said second operation means and controls a driving speed of said variator lens means in response to an operation speed of said first operation means.

7. An image pickup apparatus according to claim 6, wherein said first operation means comprises a rotary member rotatably disposed on a lens barrel which houses said variator lens means and said compensator lens means therein, and rotation detecting means for detecting a rotating position and a rotating direction of said rotary member, and wherein said first control means is arranged to perform control according to a result of detection provided by said rotation detecting means.

8. An image pickup apparatus according to claim 6, wherein said first control means is arranged to perform control making reference to information on a positional relation between said variator lens means and said compensator lens means stored beforehand.

9. An image pickup apparatus according to claim 6, wherein said second control means is arranged to extract a focus signal from the image signal and to send the focus signal to said first control means, and wherein said first control means is arranged to perform control on the basis of information on a positional relation between said variator lens means and said compensator lens means stored beforehand and on the basis of the focus signal supplied from said second control means.

10. An image pickup apparatus according to claim 6, wherein said has unit further comprises position detecting means for detecting a position of said variator lens means and that of said compensator lens means, said first control means being arranged to transmit, to said second control means, a detection output of said position detecting means and information on a state of the operation of said first operation means, and wherein said image pickup apparatus body further comprises electronic magnification varying means for electronically magnify or reduce an image plane of the image signal, said second control means being arranged to control said electronic magnification varying means on the basis of the detection output and the information on the state of the operation supplied from said first control means.

11. A lens device interchangeable to a camera body, comprising:

variator lens means for performing a magnification varying action;

compensator lens means for correcting a focus condition;

first operation means arranged in said lens device operable by a user for manually causing the magnification varying action to be performed; and control means for controlling the magnification varying action by moving said variator lens means and said compensator lens means according to an operation of said first operation means and a control signal generated in response to an operation of second operation means arranged in said camera body, wherein said control means inhibits the magnification varying action according to the control signal generated by said second operation means during the magnification action by said first operation means and controls a driving speed of said variator lens means in response to an operation speed of said first operation means.

* * * * *

UNITED STATES PATENT AND TRADEMARK OFFICE
CERTIFICATE OF CORRECTION

PATENT NO. : 6,731,339 B2
DATED : May 4, 2004
INVENTOR(S) : Hiroto Ohkawara

It is certified that error appears in the above-identified patent and that said Letters Patent is hereby corrected as shown below:

<u>Column 3,</u>
Line 56, delete "oh the basis" and insert -- on the basis --.

<u>Column 29,</u>
Line 25, delete "wherein said has unit" and insert -- wherein said lens unit --.

Signed and Sealed this

Twenty-eighth Day of March, 2006

JON W. DUDAS
*Director of the United States Patent and Trademark Office*